US008037345B1

(12) United States Patent
Iyer et al.

(10) Patent No.: US 8,037,345 B1
(45) Date of Patent: Oct. 11, 2011

(54) DETERMINISTIC RECOVERY OF A FILE SYSTEM BUILT ON A THINLY PROVISIONED LOGICAL VOLUME HAVING REDUNDANT METADATA

(75) Inventors: Sairam Iyer, South Grafton, MA (US); Rahul Bhagwat, Karnataka (IN); Ajay Potnis, Maharashtra (IN); Amit Dharmadhikari, Pune (IN); Miles A. DeForest, Bahama, NC (US); Dixit Patel, Monroe, NJ (US)

(73) Assignee: EMC Corporation, Hopkinton, MA (US)

( * ) Notice: Subject to any disclaimer, the term of this patent is extended or adjusted under 35 U.S.C. 154(b) by 15 days.

(21) Appl. No.: 12/752,031

(22) Filed: Mar. 31, 2010

(51) Int. Cl.
*G06F 11/00* (2006.01)

(52) U.S. Cl. .................. 714/6.12; 714/20; 714/766

(58) Field of Classification Search .................. None
See application file for complete search history.

(56) References Cited

U.S. PATENT DOCUMENTS

| | | | |
|---|---|---|---|
| 5,893,140 A | 4/1999 | Vahalia et al. | |
| 6,161,104 A | 12/2000 | Stakutis et al. | |
| 6,173,293 B1 | 1/2001 | Thekkath et al. | |
| 6,185,601 B1 | 2/2001 | Wolff | |
| 6,324,581 B1 * | 11/2001 | Xu et al. | 709/229 |
| 6,499,039 B1 * | 12/2002 | Venkatesh et al. | 1/1 |
| 6,697,846 B1 | 2/2004 | Soltis | |
| 6,973,455 B1 | 12/2005 | Vahalia et al. | |
| 7,107,385 B2 | 9/2006 | Rajan et al. | |
| 7,165,158 B1 | 1/2007 | Yagawa | |
| 7,272,654 B1 | 9/2007 | Brendel | |
| 7,546,319 B1 | 6/2009 | Srinivasan et al. | |
| 7,546,364 B2 * | 6/2009 | Raman et al. | 709/224 |
| 7,549,089 B1 | 6/2009 | Kimmel et al. | |
| 7,552,146 B1 | 6/2009 | Kahn et al. | |
| 7,631,155 B1 | 12/2009 | Bono et al. | |
| 7,694,191 B1 | 4/2010 | Bono et al. | |
| 7,818,535 B1 * | 10/2010 | Bono et al. | 711/173 |
| 7,873,619 B1 * | 1/2011 | Faibish et al. | 707/705 |
| 7,882,386 B1 * | 2/2011 | Potnis et al. | 714/2 |
| 2002/0138502 A1 | 9/2002 | Gupta | |
| 2004/0030822 A1 | 2/2004 | Rajan et al. | |
| 2004/0059822 A1 | 3/2004 | Jiang et al. | |
| 2004/0210583 A1 | 10/2004 | Enko et al. | |
| 2005/0044162 A1 | 2/2005 | Liang et al. | |
| 2005/0065986 A1 | 3/2005 | Bixby et al. | |
| 2005/0066095 A1 | 3/2005 | Mullick et al. | |

(Continued)

OTHER PUBLICATIONS

Uresh Vahalia, Unix Internals: The New Frontiers, 1996, p. 261-289 and 338-371, Prentice-Hall, Inc., Upper Saddle River, NJ.

(Continued)

*Primary Examiner* — Christopher McCarthy
(74) *Attorney, Agent, or Firm* — Richard Auchterlonie; Novak Druce & Quigg, LLP

(57) ABSTRACT

A file server architecture decouples logical storage from physical storage and provides proactive detection and containment of faults, errors, and corruptions in a file system, in order to enable in place (online) and non-intrusive recovery. The file system is built upon a thinly provisioned logical volume, and there are stored three copies of the metadata defining the logical volume in order to provide quick, deterministic, and reliable recovery from a faulted system. A first copy of the metadata is distributed among all of the slices of physical storage allocated to the logical volume. A second copy of the metadata is stored in a root slice of the logical volume. A third copy of the metadata is stored separate from the slices of physical storage allocated to the logical volume.

20 Claims, 23 Drawing Sheets

U.S. PATENT DOCUMENTS

| | | |
|---|---|---|
| 2005/0125503 A1 | 6/2005 | Iyengar et al. |
| 2005/0149528 A1 | 7/2005 | Anderson et al. |
| 2005/0198401 A1 | 9/2005 | Chron et al. |
| 2005/0246382 A1 | 11/2005 | Edwards |
| 2005/0256859 A1 | 11/2005 | Keohane et al. |
| 2006/0075191 A1 | 4/2006 | Lolayekar et al. |
| 2006/0212746 A1 | 9/2006 | Amegadzie et al. |
| 2006/0288026 A1 | 12/2006 | Zayas et al. |
| 2007/0067256 A1 | 3/2007 | Zayas et al. |
| 2007/0088702 A1 | 4/2007 | Fridella et al. |
| 2007/0136548 A1 | 6/2007 | Mane |
| 2007/0260830 A1 | 11/2007 | Faibish et al. |
| 2007/0260842 A1 | 11/2007 | Faibish et al. |
| 2008/0005468 A1 | 1/2008 | Faibish et al. |
| 2008/0189343 A1 | 8/2008 | Hyer et al. |

OTHER PUBLICATIONS

Bill Nowicki, Network Working Group, RFC 1094, "NFS: Network File System Protocol Specification," Mar. 1989, 27 pages, Sun Microsystems, Inc., Santa Clara, CA.

S. Shepler et al., "Network File System (NFS) Version 4 Protocol," Network Working Group, Request for Comments: 3530, Apr. 2003, 275 pages, The Internet Society, Reston, VA.

Paul J. Leach and Dilip C. Naik, "A Common Internet File System (CIFS/1.0) Protocol," Network Working Group, Internet Engineering Task Force, Dec. 19, 1997, 121 pages, The Internet Society, Reston, VA.

J. Satran et al., "Internet Small Computer Systems Interface (iSCSI)," Network Working Group, Request for Comments: 3720, Apr. 2004, 257 pages, The Internet Society, Reston, VA.

D. Patterson et al., "Introduction to Redundant Arrays of Inexpensive Disks (RAID)," Spring Compcon 89, Thirty-fourth IEEE Computer Society International Conference, Feb. 27-Mar. 3, 1989, San Francisco, p. 112-117, IEEE, New York, NY.

"Introducing RAID 5 on Symmetrix DMX," EMC White Paper, Jan. 19, 2004, 12 pages, EMC Corporation, Hopkinton, MA.

"Celerra File Server Architecture for High Availability," Aug. 1999, 11 pages, EMC Corporation, Hopkinton, MA.

"Enginuity: The Symmetrix Storage Operating Environment," EMC White Paper, 2005, 21 pages, EMC Corporation, Hopkinton, MA.

"EMC Symmetrix DMX Architecture," Product Description Guide, 2004, 76 pages, EMC Corporation, Hopkinton, MA.

Applying EMC OnCourse Teckhnology In a Content Aggregation Scenario, Engineering White Paper, May 6, 2003, 14 pages, EMC Corporation, Hopkinton, MA.

"Celerra Data Migration Service (CDMS)," White Paper, Jan. 2002, 14 pages, EMC Corporation, Hopkinton, MA.

"EMC Double Checksum for Oracle," Engineering White Paper, Jan. 1, 2004, 11 pages, EMC Corporation, Hopkinton, MA.

"fsck(8): check/repair file system—Linux man page," die.net, printed Jun. 30, 2006, 3 pages.

"Information Lifecycle Management: An Automated Approach," Technical White Paper, Dec. 8, 2003, 20 pages, EMC Corporation, Hopkinton, MA.

"Automated Resource Management," Technology Brief—Aug. 2002, 3 pages, The Enterprise Storage Group, Milford, MA.

W. Rickard et al., "Shared Storage Model—A framework for describing storage architectures," SNIA Technical Council, snia.org, Apr. 13, 2003, 41 pages, Storage Networking Industry Association.

S. Kang and A. Reddy, Virtual Allocation: A scheme for flexible storage allocation, Proc. of OASIS workshop in conjunction with ASPLOS, Oct. 2004, 5 pages, Association for Computing Machinery, New York, NY.

"ReiserFS," printed Dec. 7, 2005, 55 pages, namesys.com, Oakland, CA.

S. Sikand and R. March, "Highly Scalable, High Performance Perforce Server Environments," Perforce User Conference, May 2003, 12 pages, Las Vegas, NV.

Menon et al., "IBM Storage Tank—a heterogeneous scalable SAN file system," IBM Systems Journal, vol. 42, No. 2, 2003, pp. 250-267, IBM Corp., Armonk, NY.

"File Virtualization with Acopia's Adaptive Resource Switching," 2004, 10 pages, Acopia Networks, Lowell, MA.

"Object Storage Architecture: Defining a new generation of storage systems built on distributed, intelligent storage devices," White Paper, Oct. 19, 2003, 18 pages, Panasas, Inc., Fremont, CA.

"Shared Storage Cluster Computing," Jan. 27, 2005, 22 pages, Panasas, Inc., Fremont, CA.

Alan Radding, "ATA/SATA drives fitting bigger niches," Storage Networking World Online, Mar. 8, 2004, 3 pages, Computerworld, Framingham, MA.

* cited by examiner

DETERMINISTIC RECOVERY OF A FILE SYSTEM BUILT ON A THINLY PROVISIONED LOGICAL VOLUME HAVING REDUNDANT METADATA

FIELD OF THE INVENTION

The present invention relates generally to file servers, and more particularly to programming for a network file server providing access to file systems built on thinly provisioned logical volumes of storage.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference.

Typically the logical block addresses of storage are subdivided into logical volumes. Each logical volume is mapped to the physical storage using a respective striping and redundancy scheme. The data mover computers typically use the Network File System (NFS) protocol to receive file access commands from clients using the UNIX (Trademark) operating system or the LINUX (Trademark) operating system, and the data mover computers use the Common Internet File System (CIFS) protocol to receive file access commands from clients using the MicroSoft (MS) WINDOWS (Trademark) operating system. The NFS protocol is described in "NFS: Network File System Protocol Specification," Network Working Group, Request for Comments: 1094, Sun Microsystems, Inc., Santa Clara, Calif., March 1989, 27 pages, and in S. Shepler et al., "Network File System (NFS) Version 4 Protocol," Network Working Group, Request for Comments: 3530, The Internet Society, Reston, Va., April 2003, 262 pages. The CIFS protocol is described in Paul J. Leach and Dilip C. Naik, "A Common Internet File System (CIFS/1.0) Protocol," Network Working Group, Internet Engineering Task Force, The Internet Society, Reston, Va., Dec. 19, 1997, 121 pages.

The data mover computers may also be programmed to provide clients with network block services in accordance with the Internet Small Computer Systems Interface (iSCSI) protocol, also known as SCSI over IP. The iSCSI protocol is described in J. Satran et al., "Internet Small Computer Systems Interface (iSCSI)," Network Working Group, Request for Comments: 3720, The Internet Society, Reston, Va., April 2004, 240 pages. The data mover computers use a network block services protocol in a configuration process in order to export to the clients logical volumes of network attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference.

A storage object such as a virtual disk drive or a raw logical volume can be contained in a file compatible with the UNIX (Trademark) operating system so that the storage object can be exported using the NFS or CIFS protocol and shared among the clients. In this case, the storage object can be replicated and backed up using conventional file replication and backup facilities without disruption of client access to the storage object. See, for example, Liang et al., Patent Application Publication US 2005/0044162 A1 published Feb. 24, 2005, entitled "Multi-Protocol Sharable Virtual Storage Objects," incorporated herein by reference. The container file can be a sparse file. As data is written to a sparse file, the size of the file can grow up to a pre-specified maximum number of blocks, and the maximum block size can then be extended by moving the end-of-file (eof). See, for example, Bixby et al., Patent Application Publication US 2005/0065986 A1 published Mar. 24, 2005, entitled "Maintenance of a File Version Set Including Read-Only and Read-Write Snapshot Copies of a Production File," incorporated herein by reference, and Mullick et al., Patent Application Publication 2005/0066095 A1 published Mar. 24, 2005, entitled "Multi-Threaded Write Interface and Methods for Increasing the Single File Read and Write Throughput of a File Server," incorporated herein by reference.

SUMMARY OF THE INVENTION

It is desired to provide proactive detection and containment of faults, errors, and corruptions in a file system, in order to enable in place (online) and non-intrusive recovery. Moreover, it is desired to build the file system upon a thinly provisioned logical volume, and to provide enhanced protection of metadata defining the thinly provisioned logical volume in order to have quick, deterministic, and reliable recovery from a faulted system.

In accordance with one aspect, the invention provides a file server including physical data storage, and at least one data processor coupled to the physical data storage for accessing the physical data storage. The at least one data processor is programmed for maintaining a sparse metavolume of the physical data storage. The sparse metavolume includes slices of the physical data storage allocated to the sparse metavolume. The sparse metavolume provides logical data storage. Some of the logical data storage is mapped to the slices of the physical data storage allocated to the sparse metavolume. Some of the logical data storage does not have allocated physical storage and is not mapped to the slices of the physical data storage allocated to the sparse metavolume. The sparse metavolume has slice metadata defining the allocation of the slices of the physical data storage to the sparse metavolume and the mapping of the logical data storage to the slices of the physical data storage that are allocated to the sparse metavolume. The file server stores three copies of the slice metadata, and the at least one data processor is programmed with a recovery program executable by the at least one data processor to recover from a disruption by comparing the three copies of the slice metadata to detect and correct errors in the slice metadata.

In accordance with another aspect, the invention provides a file server including physical data storage, and at least one data processor coupled to the physical data storage for accessing the physical data storage. The at least one data processor is programmed for maintaining a sparse metavolume of the physical data storage. The sparse metavolume includes slices of the physical data storage allocated to the sparse metavolume. The sparse metavolume provides logical data storage. Some of the logical data storage is mapped to the slices of the physical data storage allocated to the sparse metavolume. Some of the logical data storage does not have allocated physical storage and is not mapped to the slices of the physical data storage allocated to the sparse metavolume. The sparse metavolume has slice metadata defining the allocation of the slices of the physical data storage to the sparse metavolume and the mapping of the logical data storage to the slices of the physical data storage that are allocated to the sparse metavolume. The file server stores three copies of the slice metadata, and the at least one data processor is programmed with a recovery program executable by the at least one data processor to recover from a disruption by comparing the three copies of the slice metadata to detect and correct errors in the slice metadata. A first one of the three copies of the slice metadata is maintained in one of the slices allocated to the sparse metavolume. Each slice of physical data storage allocated to the sparse metavolume includes a slice mark containing a respective portion of the slice metadata defining allocation of each slice to the sparse metavolume and mapping of the logical data storage of the sparse metavolume to each slice. A second one of the three copies of the slice metadata is comprised of the respective portions of the slice metadata in the slice marks of the slices of physical data storage allocated to the metavolume. The slice marks are chained together by links, and the recovery procedure is executable by the at least one data processor to recover from the disruption by following the links to collect the slice metadata contained in the slice marks. A third one of the three copies of the slice metadata is stored in a kernel mode database separate from the slices of the physical data storage allocated to the sparse metavolume.

In accordance with a final aspect, the invention provides a computer-implemented method of operating a file server. The file server has physical data storage and a sparse metavolume of the physical data storage. The sparse metavolume includes slices of the physical data storage allocated to the sparse metavolume. The sparse metavolume provides logical data storage. Some of the logical data storage is mapped to the slices of the physical data storage allocated to the sparse metavolume. Some of the logical data storage does not have allocated physical storage and is not mapped to the slices of the physical data storage allocated to the sparse metavolume. The sparse metavolume has slice metadata defining the allocation of the slices of the physical data storage to the sparse metavolume and the mapping of the logical data storage of the sparse metavolume to the slices of the physical data storage that are allocated to the sparse metavolume. The method includes maintaining three copies of the slice metadata in the physical data storage, and recovering from a disruption in operation of the file server by executing a recovery program in memory of the file server. The recovery program compares the three copies of the slice metadata to detect and correct errors in the slice metadata.

BRIEF DESCRIPTION OF THE DRAWINGS

Additional features and advantages of the invention will be described below with reference to the drawings, in which.

Figure 1:
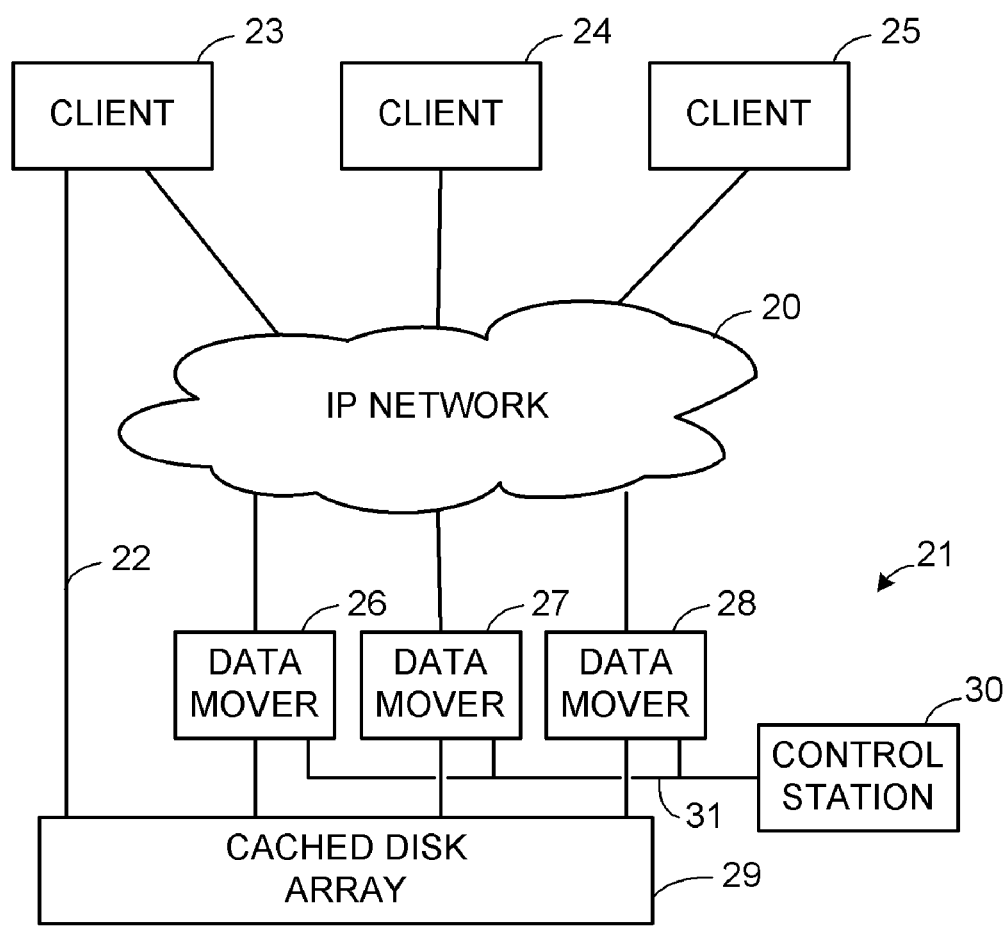
FIG. 1 is a block diagram of a data processing system including multiple clients and a network file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

1. High-level Architecture of a Multi-Protocol Network File Server

FIG. 1 shows an Internet Protocol (IP) network 20 including a multi-protocol network file server 21 and multiple clients 23, 24, 25. The network file server 21, for example, has multiple data mover computers 26, 27, 28 for moving data between the IP network 20 and a cached disk array 29. The network file server 21 also has a control station 30 connected via a dedicated dual-redundant data link 31 among the data movers for configuring the data movers and the cached disk array 29.

Further details regarding the network file server 21 are found in Vahalia et al., U.S. Pat. No. 5,893,140, incorporated herein by reference, and Xu et al., U.S. Pat. No. 6,324,581, issued Nov. 27, 2001, incorporated herein by reference. The network file server 21 is managed as a dedicated network appliance, integrated with popular network operating systems in a way, which, other than its superior performance, is transparent to the end user. The clustering of the data movers 26, 27, and 28 as a front end to the cached disk array 29 provides parallelism and scalability. Each of the data movers 26, 27, 28 is a high-end commodity computer, providing the highest performance appropriate for a data mover at the lowest cost. The data mover computers 26, 27, 28 may communicate with the other network devices using standard file access protocols such as the Network File System (NFS) or the Common Internet File System (CIFS) protocols, but the data mover computers do not necessarily employ standard operating systems. For example, the network file server 21 is programmed with a Unix-based file system that has been adapted for rapid file access and streaming of data between the cached disk array 29 and the data network 20 by any one of the data mover computers 26, 27, 28.

Figure 2:
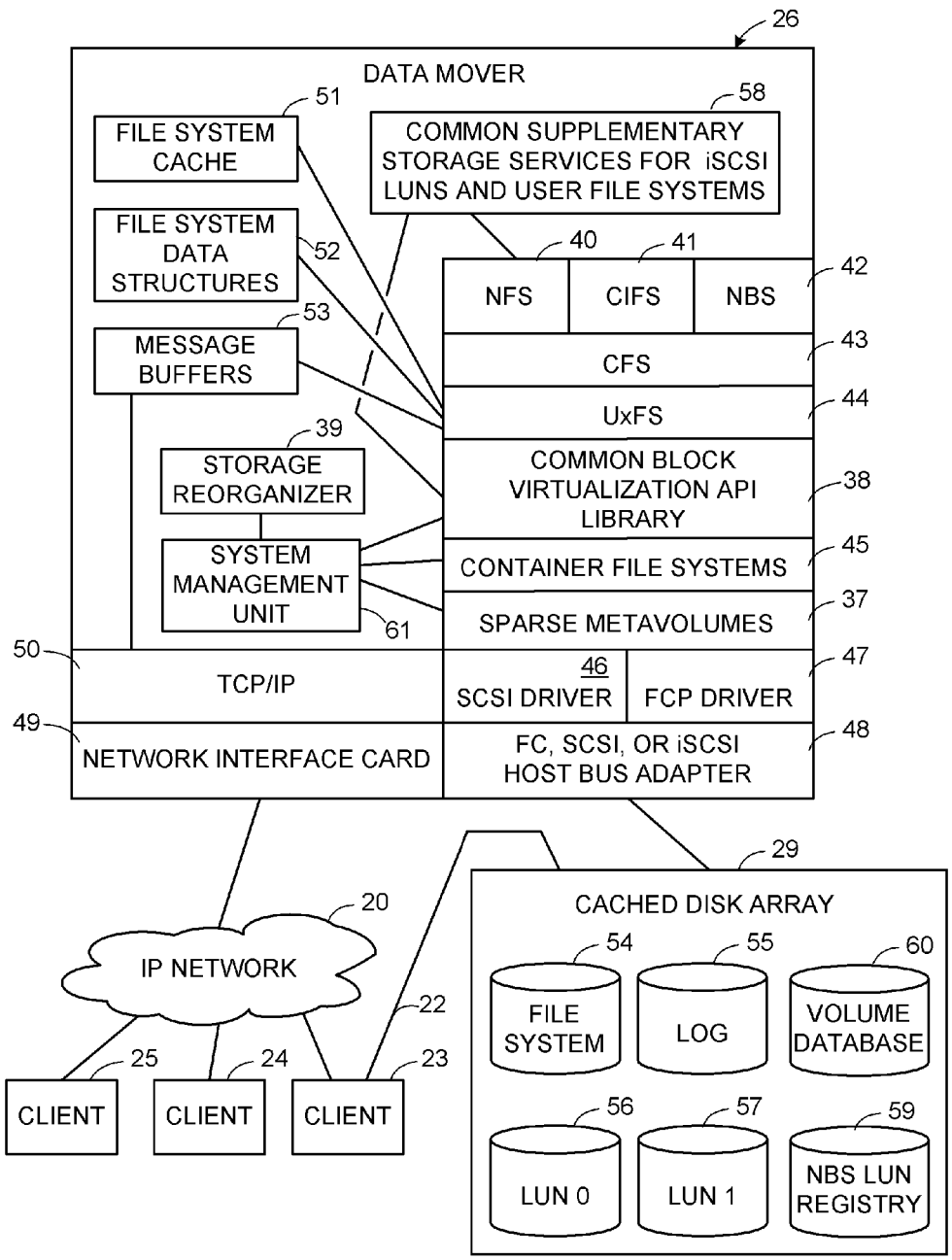
FIG. 2 is a block diagram showing further details of the network file server in the data processing system of FIG. 1.

FIG. 2 shows software modules in the data mover 26 introduced in FIG. 1. The data mover has a Network File System (NFS) module 40 for supporting communication among the clients and data movers of FIG. 1 over the IP network 20 using the NFS file access protocol, and a Common Internet File System (CIFS) module 41 for supporting communication over the IP network using the CIFS file access protocol. The data mover 26 also has a network block services (NBS) module 42 for exporting to the clients logical volumes 56, 57 of network attached storage in the cached disk array 29. These logical volumes 56, 57 then become pseudo-disk instances that appear local to the clients. The clients may then use the Internet Small Computer Systems Interface (iSCSI) protocol with the data mover 26 to access these logical volumes as iSCSI logical unit number (LUNs), as further described in Jiang et al., Patent Application Publication US 2004/0059822 A1 published Mar. 25, 2004, incorporated herein by reference. The NBS module has a LUN registry 59 in storage to provide a mapping of a (target, LUN) specifier in a client request to the logical storage address of the LUN 56, 57 in the cached disk array.

The NFS module 40, the CIFS module 41, and the NBS module 42 are layered over a Common File System (CFS) module 43, and the CFS module is layered over a Universal File System (UxFS) module 44. The UxFS module supports a UNIX-based file system, and the CFS module 43 provides higher-level functions common to NFS, CIFS, and NBS.

Figure 3:
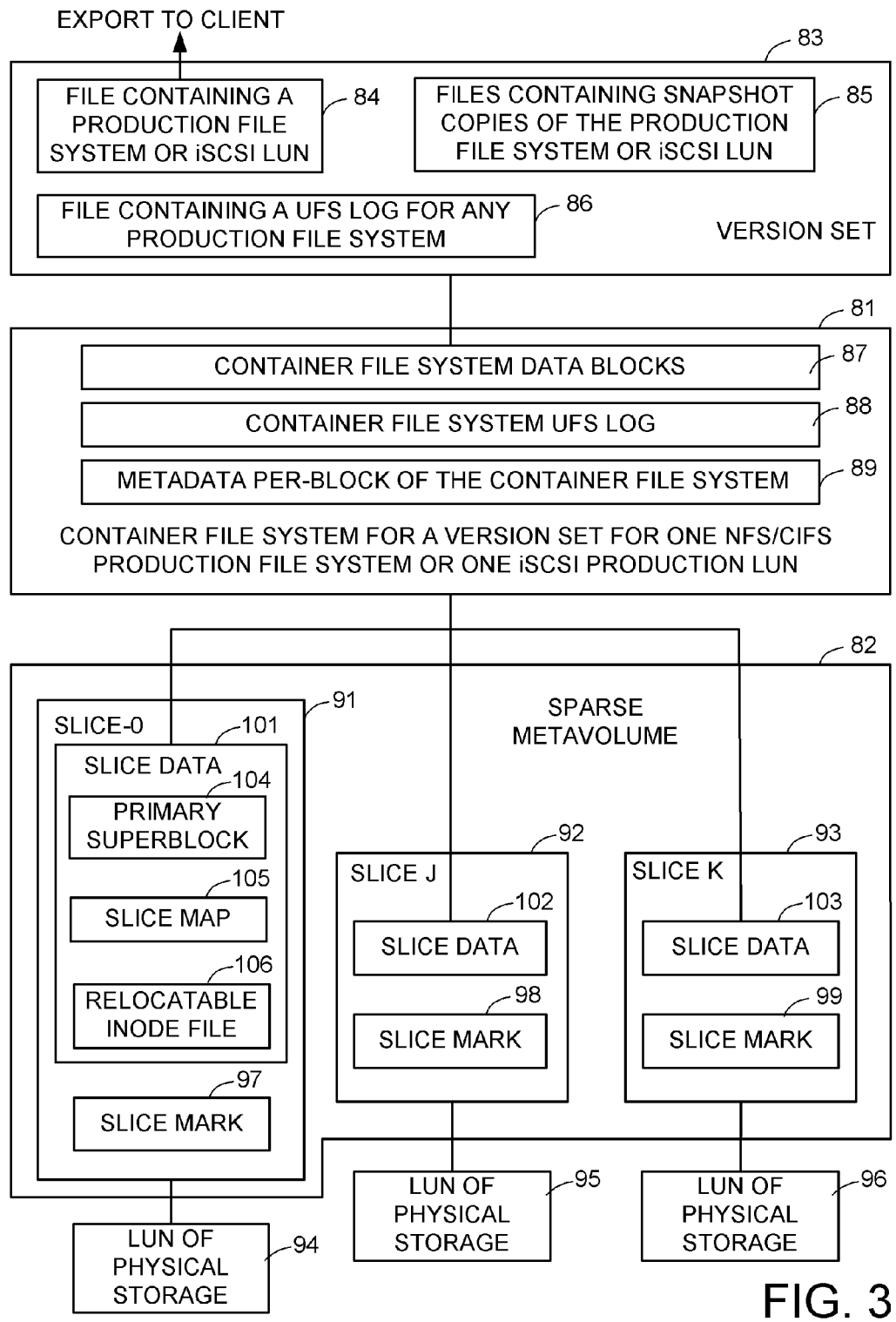
FIG. 3 is a block diagram showing a file server storage architecture including a sparse metavolume and a container file system built on the sparse metavolume.

As will be further described below with reference to FIG. 3, the data mover 26 provides enhanced decoupling of logical storage from physical storage by storing version sets of an iSCSI LUN or a user file system in a container file system built upon a sparse metavolume. As shown in FIG. 2, a container file systems layer 45 provides access to the container file systems, and a sparse metavolumes layer 37 provides access to the sparse metavolumes. A common block virtualization library 38 provides an application interface to the container file systems layer 45 and the sparse metavolumes layer 37 by translating from asynchronous to synchronous operation and implementing exchange semantics. The common block virtualization library 38 also provides utility programs for various features of the container file systems and the sparse metavolumes in order to reduce the total cost of ownership of the file server and enhance data availability and storage scalability. These features include use of a storage reorganizer 39 for improved thin provisioning and enhanced data mobility between levels of tiered storage, more flexible redundant data elimination, improved fault detection and finer granularity of fault containment, and seamless integration of common supplementary storage services 58 for iSCSI LUNs and user file systems, such as services for backup, recovery, and information lifecycle management (ILM). For example, the common supplementary storage services 58 use the NFS module 40 for access to the container file systems in a conventional fashion, and call application program interface (API) routines in the library 38 for access to unconventional features of the container file systems and for control and access to metadata of the sparse metavolumes 37. The integrity of the metadata of the sparse metavolumes is maintained by a system management unit 61, as further described below with reference to FIG. 16.

As shown in FIG. 2, the sparse metavolume layer 37 provides a free mapping from certain slices of the logical extents of the metavolumes to configured slices of logical storage in the cached disk array 29. The configured slices of logical storage are defined by storage configuration information in a volume database 60 in the cached disk array 29. The sparse metavolumes layer 37 is layered over a SCSI driver 46 and a Fibre-channel protocol (FCP) driver 47 in order to access the configured slices of logical storage in the cached disk array 29. The data mover 26 sends storage access requests through a host bus adapter 48 using the SCSI protocol, the iSCSI protocol, or the Fibre-Channel protocol, depending on the physical link between the data mover 26 and the cached disk array 29.

A network interface card 49 in the data mover 26 receives IP data packets from the IP network 20. A TCP/IP module 50 decodes data from the IP data packets for the TCP connection and stores the data in message buffers 53. For example, the UxFS layer 44 writes data from the message buffers 53 to a file system 54 in the cached disk array 29. The UxFS layer 44 also reads data from the file system 54 or a file system cache 51 and copies the data into the message buffers 53 for transmission to the network clients 23, 24, 25.

To maintain the file system 54 in a consistent state during concurrent writes to a file, the UxFS layer maintains file system data structures 52 in random access memory of the data mover 26. To enable recovery of the file system 54 to a consistent state after a system crash, the UxFS layer writes file metadata to a log 55 in the cached disk array during the commit of certain write operations to the file system 54. The network file server 21 also provides metadata services to the client 23 so that the client may perform read and write operations directly to the cached disk array 29 over a data link 22. For example, as described in Vahalia et al. U.S. Pat. No. 6,973,455 issued Dec. 6, 2005, incorporated herein by reference, the client 23 sends to the file server 21 at least one request for access to a file. In response, the file server 21 grants a lock to the client 23, and returns to the client metadata of the file including information specifying data storage locations in the cached disk array 29 for storing data of the file. The client 23 receives the metadata, and uses the metadata to produce at least one data access command for accessing the data storage locations in the cached disk array 29. The client sends the data access command to the cached disk array 29 to read or write data to the file. For a write operation, the client 23 may modify the metadata. When the client 23 is finished writing to the file, the client returns any modified metadata to the file server 21.

Details of various features introduced in FIG. 2 are further described in Bono et al. U.S. Pat. No. 7,631,155 issued Dec. 8, 2009, and entitled "Thin Provisioning of a File System and an ISCSI LUN Through a Common Mechanism," incorporated herein by reference. The following description relates to details of the features introduced in FIG. 2 for deterministic recovery of a file system built on a sparse metavolume.

2. Container file Systems and Sparse Metavolumes

It is desired to provide a common mechanism for thin provisioning of a production file system or an iSCSI LUN exported to a client. As shown in FIG. 3, this is done by providing a file server architecture including a container file system 81 built on a sparse metavolume 82 for enhanced decoupling of logical storage from physical storage and for providing common supplementary storage services for iSCSI block access and for NFS or CIFS file system access.

The container file system 81 provides a container for a version set 83 for one production file system or iSCSI LUN 84. The version set 83 may also include any number of snapshot copies 85 of the production file system or iSCSI LUN 84. If the production object 84 is a production file system, then the version set 83 may also include a UFS log 86 for the production file system. By including the UFS log in the version set, an instantaneous snapshot or backup copy of the UFS log together with the production file system 84 can be made without pausing the production file system for flushing the UFS log prior to making the snapshot or backup copy. Instead, the UFS log can be flushed into the snapshot or backup copy anytime after the snapshot copy is made, prior to or during any restore of the production file system with the snapshot or backup copy.

The container file system 81 manages storage space among the production file system or iSCSI LUN and its snapshot copies 85. It is possible for the container file system to provide storage into the hundreds of Terabytes, for supporting thousands or more snapshots of a single production file system or iSCSI LUN.

The container file system 81 also provides improved fault containment because it is hosting a single production file system or iSCSI LUN and its snapshots. In addition to the container file system data blocks 87, the container file system 81 includes a container file system UFS log 88 and metadata 89 per-block of the container file system for enhanced detection, isolation, recovery, and reporting of any erroneous or unstable file system metadata.

For thin provisioning of the container file system 81, the sparse metavolume 82 has the ability to aggregate a plurality of N slices of the same size of logical storage space together into a contiguous logical extent while some of these slices may or may not be provisioned. A slice-0 at an offset zero in the logical extent is always provisioned. Each provisioned slice has a corresponding configured storage slice object 91, 92, 93 that is mapped to a corresponding LUN of physical storage 94, 95, 96. Each configured storage slice object 91, 92, 93 has a respective slice mark 97, 98, 99 containing metadata and state information for the provisioned slice, and a respective area of storage 101, 102, 103 for containing slice data. For example, the slice mark occupies the first two sectors (of 256 K bytes per sector) of the provisioned LUN of physical storage, and the slice data occupies the remaining sectors of the provisioned LUN of physical storage. The slice data comprise the sectors of storage backing the container file system.

An initial slice 91, referred to as a "root slice" or slice-0, is always provisioned with backing store, so that some of the slice data 101 is available to store metadata and management information for the sparse metavolume 82 and the container file system 81. This metadata and management information includes a primary superblock 104, a slice map 105, and a relocatable Mode file 106. The primary superblock 104 includes metavolume metadata such as the size of the sparse multivolume and the constant size of each slice in the sparse metavolume 82. The slice map 105 indicates whether or not any given slice of the sparse metavolume is provisioned, and if so, the slice identifier of the configured slice object. The slice identifier identifies a slice of logical storage configured from the same kind of storage in the cached disk array.

In a preferred implementation, the root slice 91 containing the slice map 105 is stored in the data portion of slice-0 of the slice, but for generality, the root slice is defined independently of slice-0 so that the slice map could be stored anywhere. For example, the root slice includes the following structure:

```
typedef rootSlice_Header {
   ulong          fsid;        // 4 bytes for fsid
   volumeName_t   svName;      // Name of Sparse Volume
   ulong          sliceSize;   // Size of each slice
}
typedef sliceEntry {
   volumeName_t   sliceId;     // 16 characters for name of
                                  slice volume
   volumeName_t   cbvId;       // 16 characters for name of
   // CBV volume or LUN information
   BlockIndex64_t offsetOnCBV; // Slice Offset on CBVvolume
                                  or LUN
}
```

The kind of storage backing each slice is indicated by a particular value of a parameter called the automatic volume management (AVM) type of the storage. Storage having a similar group of performance characteristics (such as access time, bandwidth, and read-write capability) is indicated by the same value for the AVM type. The slice map 105 includes the AVM type of each slice provisioned in the metavolume. The slice map also provides a way of quickly searching for a free block of storage in a provisioned slice of a given AVM type in the metavolume.

Thus, the slice map is used for allocating backing storage to the metavolume for provisioning data blocks to the container file system, and for reading data from or writing data to the metavolume or the container file system. In addition, the slice map is used for deallocating blocks from a slice in a shrink process, for selecting a slice for deallocation in the shrink process, for fault detection, and for fault containment.

The shrink process may remove a provisioned slice from anywhere in the sparse metavolume except slice-0 which may only be relocated to storage of a different type but which should be present at all times during the relocation process. In a shrink process, statistics maintained in the slice map are used to determine which provisioned slice should be selected to have its blocks deallocated, without having to search all of the cylinder groups of the container file system. When a provisioned slice is selected for deallocation in accordance with a configured shrink policy, the storage reorganizer is invoked to migrate the data of allocated file system blocks to free file system blocks of other provisioned slices in the container file system, and to remap the migrated file system blocks in the cylinder group. After all the data of all of the container file system blocks have been vacated from the slice, then the storage slice object is removed from the sparse metafile system and returned to a pool of free slices.

The fault containment logic uses the slice map for marking slices or cylinder groups which are unstable to prevent any subsequent access until the object becomes stable again. The slice map is also used to ensure that the container view of the sparse metavolume matches the state of the sparse metavolume itself (as indicated in the slice marks of the provisioned slices). If an inconsistency is found, then it is caught before further damage is done.

The relocatable inode file 106 is provided for use in connection with the remapping of in-use inodes of the container file system which belong to a slice that needs to be evacuated. While remapping these inodes, the inode number initially assigned to each of these inodes will not change or else it will defeat the container file system's directory logic as well as applications such as NFS which use the inode number within the file handle. So, as soon as at least one inode is remapped, the relocatable inode file is created, and from then on, any inode lookup first checks the relocatable inode file to find out whether an inode is at its original location or whether the inode has been remapped. The inode number that this inode is known by UxFS is used as an index in the file, and if there is no corresponding entry for this number in the file, it means that this inode has not been remapped and may be found at its original location. Conversely, if there is an entry for this inode number in the file, then it will contain the storage location that this inode number has been remapped to.

Figure 4:
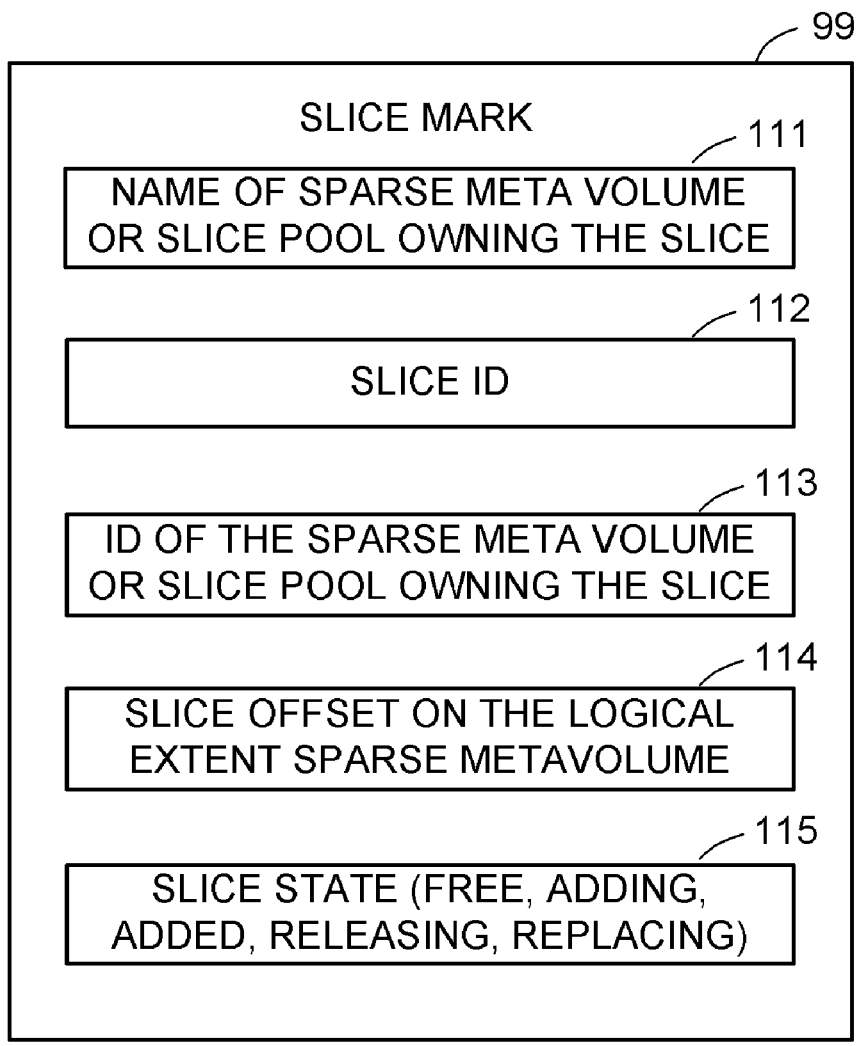
FIG. 4 is a block diagram of a slice mark introduced in FIG. 3.

FIG. 4 shows the contents of the slice mark 99. The slice mark includes a field 111 for storing the name of the sparse metavolume or slice pool that owns the configured slice object. The slice mark 99 contains a slice ID 112 that identifies the slice object so that the slice object can be mapped (in the slice map 105 in FIG. 3) to the logical extent of the sparse metavolume and also mapped to a LUN of physical storage of a particular AVM type. The slice mark includes a field 113 for containing an identification (ID) number of the sparse metavolume or slice pool that owns the provisioned slice object. The slice mark further includes a field 114 for containing the offset of the provisioned slice on the extent of the sparse metavolume when the slice is not free. The slice mark 99 further includes a slice state 115 of free, adding, added, releasing, or replacing.

The slice mark assigned to each slice object of configured storage is maintained during the lifecycle of the slice to keep track of the state that the slice is meant to be in. The slice mark is checked for consistency any time that a slice is transitioning to a different state. Should there be any inconsistencies between the slice's state and its slice mark, the action on the slice is stopped and then appropriate measures are taken immediately in order to prevent further damage to the system.

When a sparse metavolume is provisioned with a configured slice object, the configured slice object is taken from a pool of configured slices having the same size and AVM type, and when a configured slice object is removed from the sparse metavolume, the configured slice object is returned to a pool of configured slices having the same size and AVM type. In a network file server 21 having a cached disk array, multiple data movers, and a control station, as shown in FIG. 1, it is convenient for the control station to configure the slices, maintain pools of free configured slices of various sizes and AVM types, and allocate the free slices from the pools to the data movers.

Figure 5:
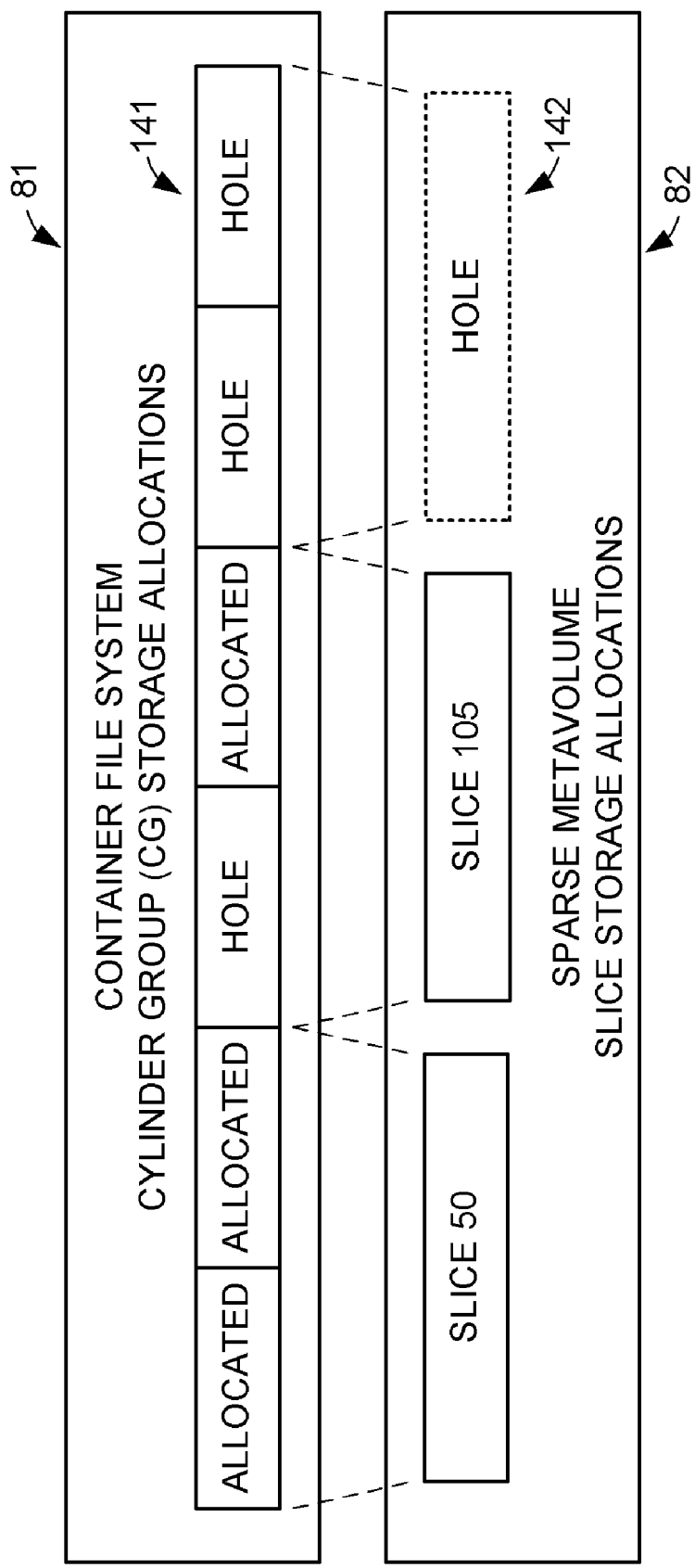
FIG. 5 is a block diagram showing a specific mapping of cylinder groups in a container file system to slices in the logical extent of a sparse metavolume.

FIG. 5 shows a relationship between cylinder group storage allocations 141 in the container file system 81 and slice storage allocations 142 in the sparse metavolume. The logical extent of the container file system is subdivided into self-contained cylinder groups of file system blocks. For a given container file system, each cylinder group has the same size, so that the cylinder group size is the granularity of storage provisioning for the container file system. For example, the file system block size is 4 kilobytes or 8 kilobytes, and the cylinder group size is 64 megabytes. At any given time, storage for each cylinder group of the container file is either allocated or not. If storage for a cylinder group is not allocated, then there is said to be a hole at that location in the logical extent of the file system. Each provisioned slice of the sparse metavolume 82 contains a certain multiple of cylinder groups of the container file system 81. None, some, or all of the cylinder groups contained in a provisioned slice can be allocated at any given time. If all of the cylinder groups in a particular provisioned slice are not allocated, then the slice can be deallocated, so that a hole will then appear in the logical extent of the sparse metavolume.

Figure 6:
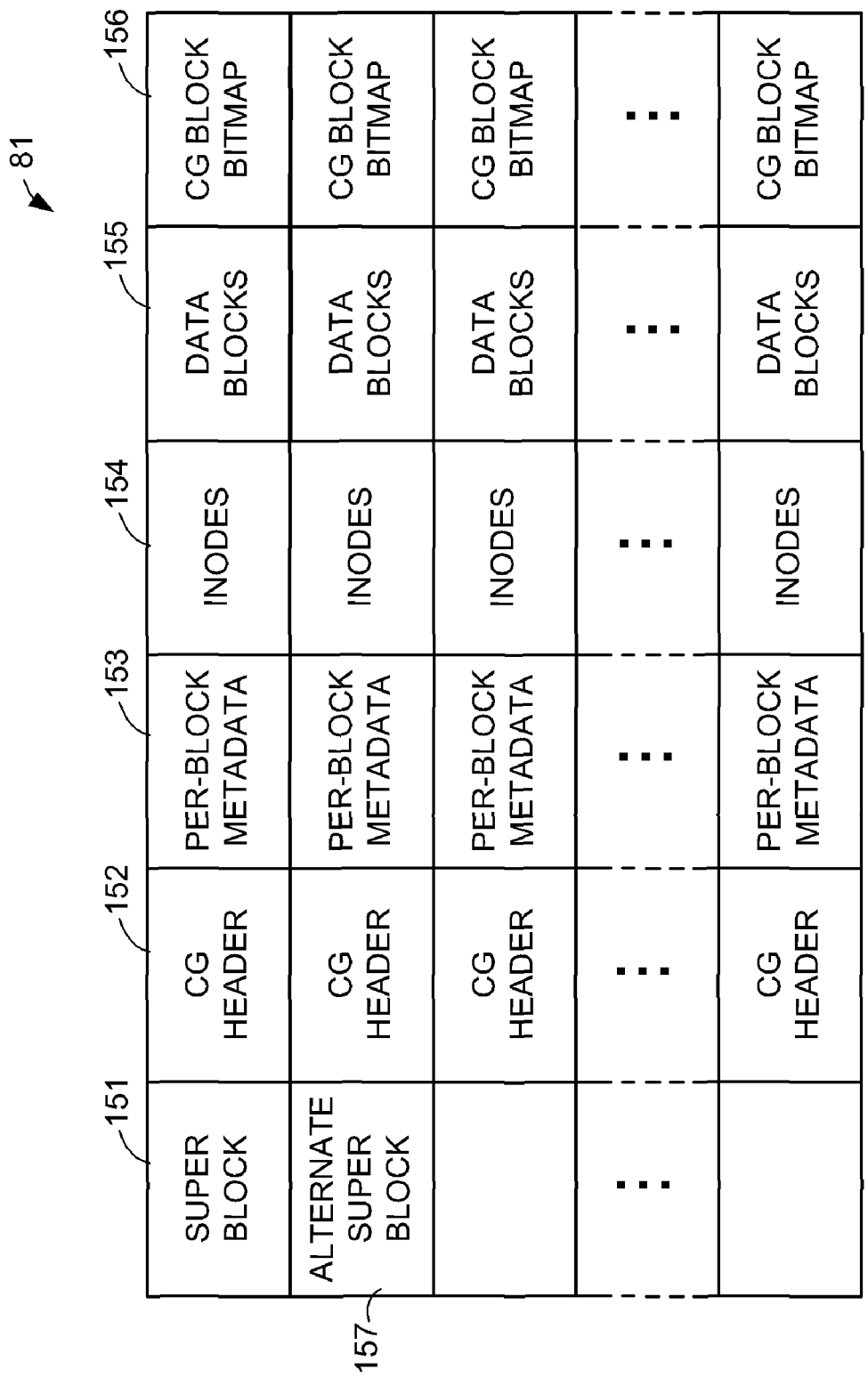
FIG. 6 is a block diagram showing components of cylinder groups of a container file system.

FIG. 6 shows a memory map of the logical extent of the container file system 81. Each cylinder group (CG) of the container file system is a respective row in this memory map. The first cylinder group contains a superblock 151 of container file system metadata, a cylinder group header 152, file system blocks for per-block metadata 153 for the file system blocks in the cylinder group, inodes 154 of the cylinder group, file system data blocks 155 for the cylinder group, and a cylinder group block bitmap 156 for indicating whether or not each file system block in the cylinder group is allocated or not. The second cylinder group has the same format as the first cylinder group. The alternate superblock 157 of the second cylinder group is a copy of the superblock 151 of the first cylinder group. Other cylinder groups have the same format except they do not have a superblock.

Figure 7:
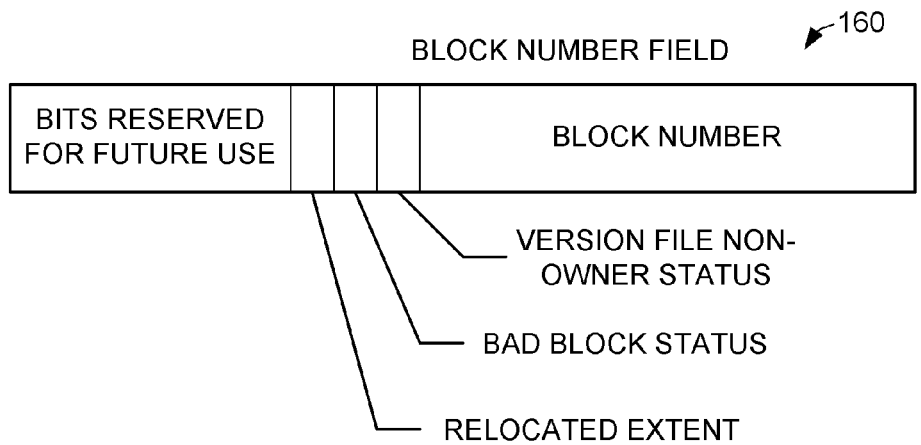
FIG. 7 is a block diagram showing information encoded into a block number field in a container file system.

FIG. 7 shows that a few bits in the block number field 160 are reserved for indicating block state. One bit has always been used to indicate the non-owner status of a block in a version file. A second bit is reserved to indicate bad block status, for example upon detection of a media sector error, duplicate allocation, or other corruption. A third bit is reserved to indicate that the block is in a relocated extent of the container file system. A few more bits are reserved for future use.

Figure 8:
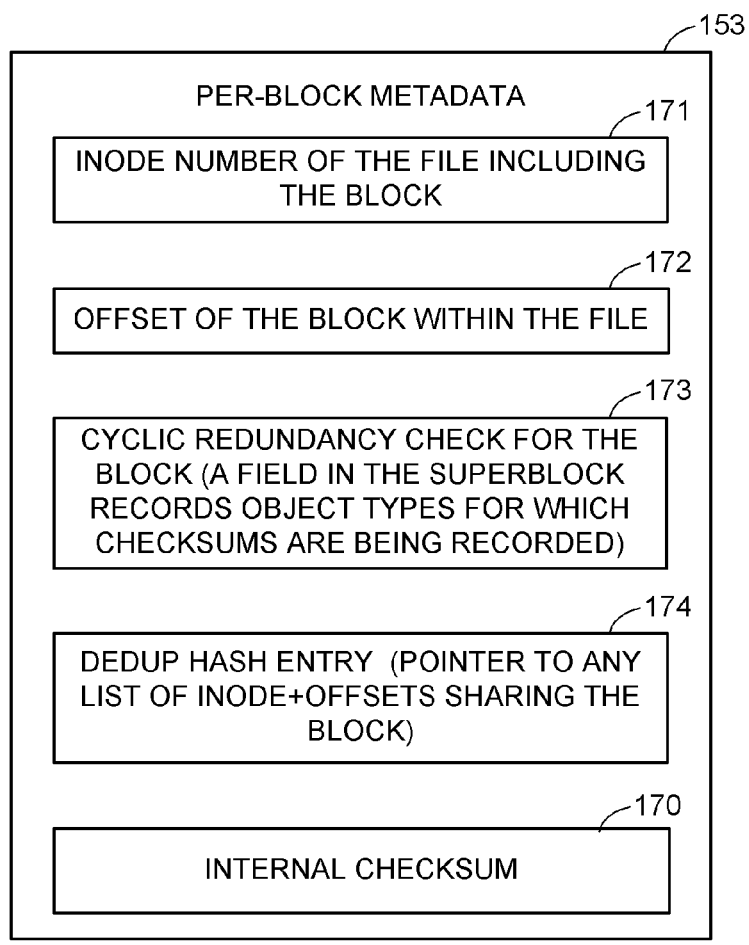
FIG. 8 is a block diagram of per-block metadata for a file system block in a container file system.

FIG. 8 shows the per-block metadata 153 for a file system block of the cylinder group. The per-block metadata 153 consists of 256 bits for each file system block of the cylinder group. The per-block metadata includes an inode number 171 of the file in the container file system including the file system block, the offset 172 of the block within the file in the container file system, a cyclic redundancy check 173 for the block, and a deduplication hash entry 174 for the block. The deduplication hash entry, for example, is a pointer to any list of inode and offsets sharing the block, or else a null or zero value if the block is not shared. The per-block metadata for each file system block also includes an internal checksum 170 protecting the integrity of the 256 bits of per-block metadata.

The inode number 171 and offset 172 for the block are updated in the same transaction that updates the allocation state in the cylinder group block bitmap (156 in FIG. 6). A block can be in one of three states: allocated, free, or reserved. A reserved block cannot be allocated or freed. The allocated/ free state is tracked in the block bitmap, and the reserved state is implicit in the block number. For debugging purposes, additional special states can be recorded in the owner inode field 171 for free and reserved blocks.

A field in the cylinder group superblock (151 in FIG. 6) records the object types whose checksums are recorded in the pre-block metadata. For example, checksums are most important for indirect blocks and slicemap blocks. When used, the cyclic redundancy check is updated in synchronization with updating of the file system block.

The per-block metadata 153 is not directly accessible to a network client, and instead it is implicitly accessed in the process of a file system operation that makes use of the cylinder group or block contents. For example, the process of allocating or freeing a block of the cylinder group validates and updates block metadata owner state. A process of allocating a new pointer in an indirect block updates the block metadata checksum for the indirect block, and adding or removing a slice updates the checksum on the slicemap block.

Figure 9:
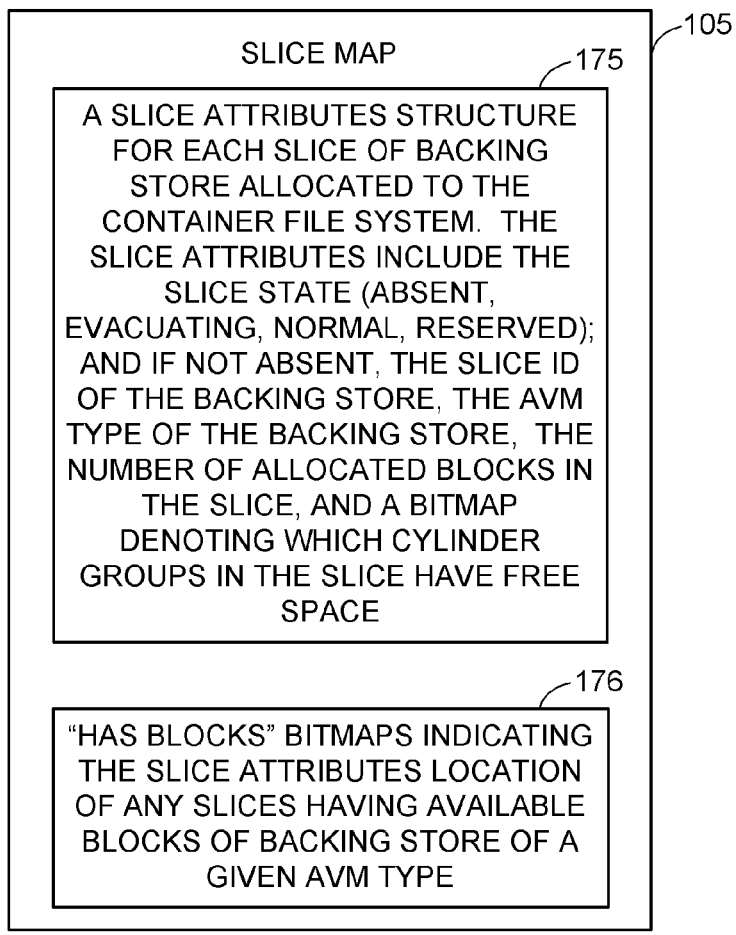
FIG. 9 is a block diagram of a slice map for a sparse metavolume.

FIG. 9 shows the slice map 105. The slicemap includes a slice attributes structure 175 for each slice of backing store allocated to the container file system. The state of each slice of the sparse metavolume is either absent, evacuating, normal, or reserved, and if the slice is not absent, then they slicemap indicates the slice ID of the configured slice object, the AVM type of the configured slice object, the number of allocated blocks in the configured slice object, and a bitmap denoting which cylinder groups in the slice have free space. The slicemap also includes "has blocks" bitmaps 176 indicating the slice attributes location having available blocks of backing store of a given AVM type.

In a preferred implementation, the slice attributes structures 175 and the "has blocks" bitmaps 176 are designed as lookup tables for efficient paging from disk into memory. The slice attributes structures for all slices (absent or not) are stored on disk as a contiguous sequence, with the attributes for each slice aligned on a 2**N byte boundary.

The "has blocks" bitmaps 176 shadow the file system blocks that contain the slice attributes structures. There is a segment in the sequence of bitmaps for each AVM type potentially provisioned in the sparse metavolume. In effect, the sequence of bitmaps is a two-dimensional array of bits, hasBlocks[NAVM, NSAB], where NAVM is the number of the AVM type that the container file system can support, and NSAB is the number of file system blocks of slice attributes structures in the container file system. hasBlocks[q, b] is true if and only if the specified file system block=b contains a slice attributes structure for a provisioned slice having available storage blocks of the specified AVM type=q. Maintaining this compact representation helps allocation by allowing it to locate free provisioned storage space without much searching.

Figure 10:
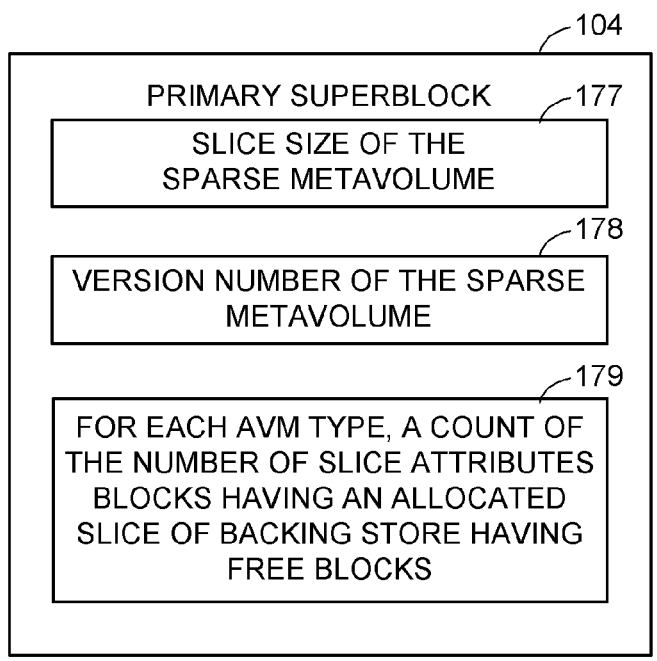
FIG. 10 is a block diagram of a primary superblock of a metavolume.

As shown in FIG. 10, the primary superblock (104 in FIG. 3) contains the slice size 177 of the sparse metavolume, a version number 178 of the sparse metavolume, and for each AVM type, a count 179 of the number of slice attributes blocks having an allocated slice of backing store having free blocks.

Figure 11:
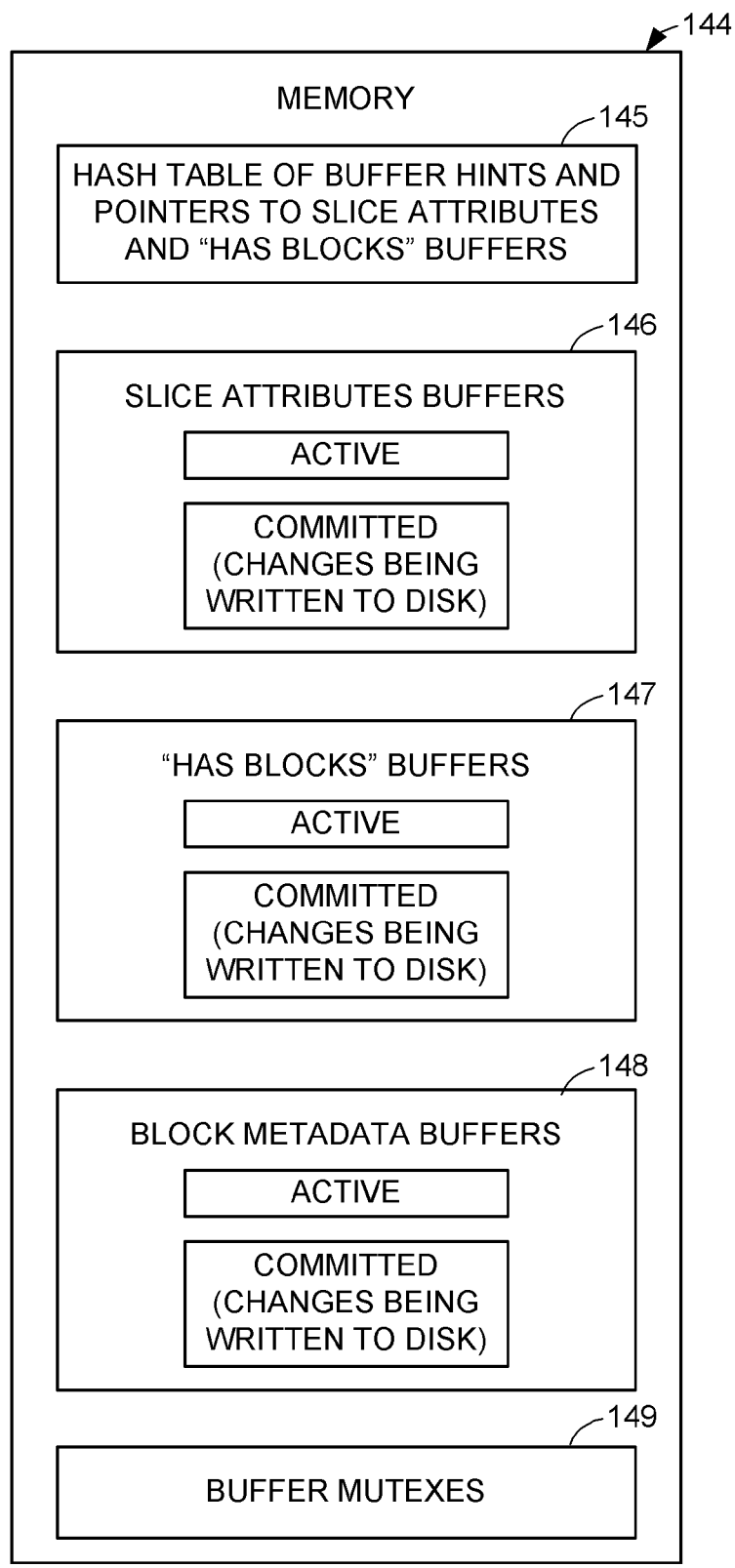
FIG. 11 is a block diagram of mapped-in-memory portions of the on-disk slice map and block metadata.

As shown in FIG. 11, the mapped-in-memory portions 144 of the on-disk slice map and block metadata includes a static least recently used (LRU) managed hash table 145 containing buffer hints and pointers to slice attributes and "has blocks" buffers, slice attributes buffers 146 including active and committed copies, "has blocks" buffers 147 including active and committed copies, block metadata buffers 148 including active and committed copies, and buffer mutexes 149 for serializing access to the buffers or ranges of entries in the buffers. The buffers are managed in active/committed pairs for transactional consistency. The active buffer is maintained while an operation is in progress, and changes are written to the committed buffer, which is held until a sync thread writes it to disk. The buffer hints facilitate re-reading of the active buffers.

Figures 12, 13:
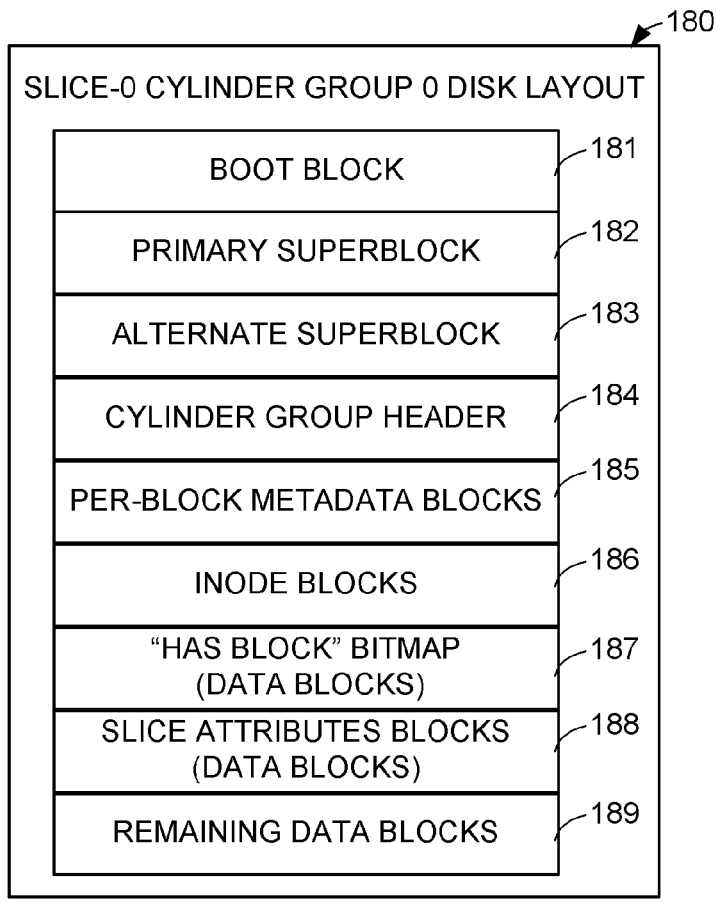
FIG. 12 is a block diagram of in-core data structures for a sparse metavolume and a container file system built upon the sparse metavolume.
FIG. 13 is a block diagram of a relocatable inode file for a container file system.

FIG. 12 shows a more specific format for the slice-0 cylinder group 0 disk layout. The disk layout includes a boot block 181, a primary superblock 182, an alternate superblock 183, a cylinder group header 184, per-block metadata blocks 185, inode blocks 186, "has block" bitmap blocks (treated as data blocks of the container file system), slice attributes blocks 188 (treated as data blocks of the container file system), and remaining data blocks 189 of the container file system.

FIG. 13 shows a specific format for the relocatable inode file 106. Each record in the file includes an old inode number and an associated new inode number. The old inode number is a primary key for searching of the records in the file.

3. Deterministic Recover of a File System Built on a Thinly Provisioned Logical Volume Having Redundant Metadata It is desired to provide enhanced protection of the metadata defining the sparse metavolume (82 in FIG. 3) in order to have quick, deterministic, and reliable recovery from a faulted system. This metadata resides in the slice marks (97, 98, 99 in FIG. 3), and a copy of this metadata resides in the slice map (105 in FIG. 3) in the root slice-0 (91 in FIG. 3). In a faulted system, however, the metadata in the slice marks may become lost or inconsistent with the metadata residing in the slice map. In this case, the slice map may be considered the more reliable source of the metadata, but if the slice map has been corrupted, manual intervention would be required to locate the slice marks and reconcile any inconsistency between the metadata in the slice marks the metadata in the slice map. Manual intervention is not only time consuming, but may also introduce manual errors, making the system vulnerable to more problems. Thus, for automatic or deterministic recovery, additional redundancy is provided to prevent the slice map from becoming a single point of failure.

In order to provide automatic or deterministic recovery of a metavolume after a system disruption, the system keeps three separate copies of the metadata defining the slices of storage allocated to the sparse metavolume. Moreover, separate pieces of the metadata are provided with respective indications of whether the pieces have been corrupted. An automatic reconciliation procedure is responsive to a comparison of the pieces of the metadata from the three copies and their respective indications of corruption in order to correct automatically any errors in the metadata for most cases of system disruption. In extreme cases of system disruption, such as a disaster scenario, the reconciliation procedure provides a system administrator with a log of where errors have been detected in the copies of the metadata, and the severity and nature of each of the errors that has been detected.

Figure 14:
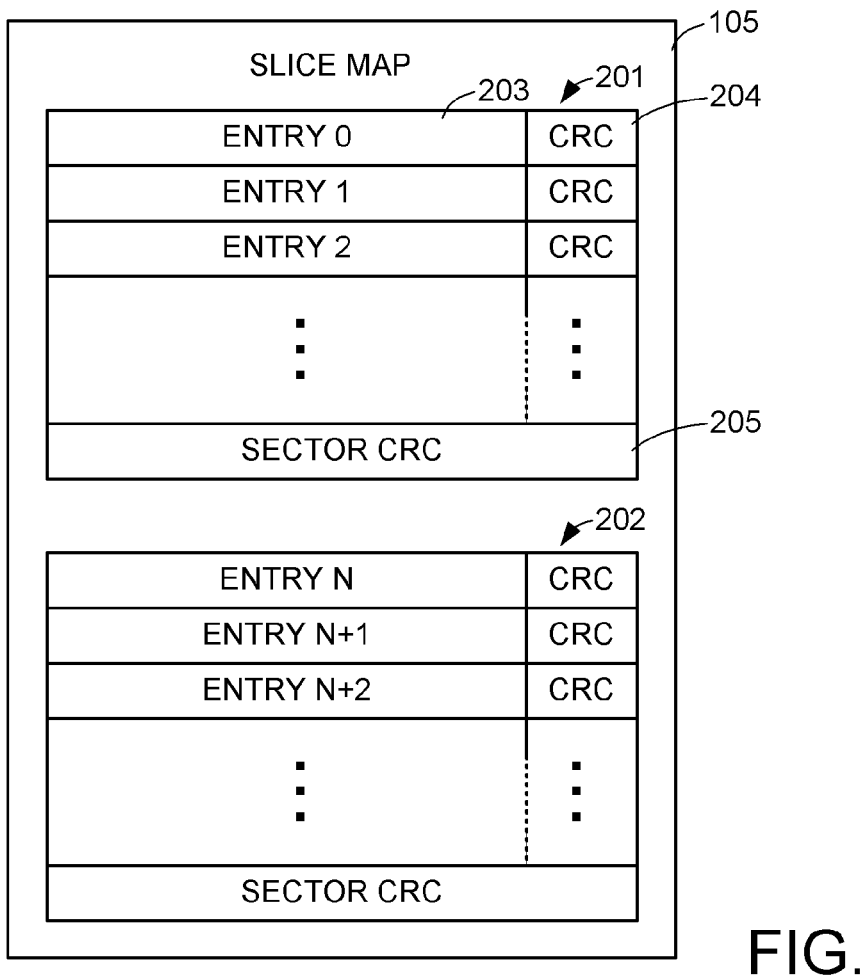
FIG. 14 is a block diagram showing cyclic redundancy checks (CRCs) in the slice map.

As shown in FIG. 14, the slice map 105 includes a number of sectors 201, 202. Each sector stores metadata in a series of entries, and each entry has a respective cyclic redundancy check (CRC) indicating whether the value in the entry has been corrupted. Thus, the sector 201 has a first entry 203, and the first entry has a CRC 204. Each sector also has a sector CRC indicating whether there is corruption somewhere in the sector. Thus, the sector 201 has a sector CRC 205. In practice, it is convenient for the total size of each entry and its CRC to be the disk block size (or a multiple of the disk block size) for a write operation, and for the sector size to include a multiplicity of entries and correspond to the array stripe size (or an integer fraction of the array stripe size) so that the sectors are aligned on the array stripes. For example, the size of each entry is 8 kilobytes, and the size of the sector is 256 kilobytes. In general, the entry size and the sector size are configured at volume creation time based on the capabilities of the file server and its back-end storage array.

Figure 15:
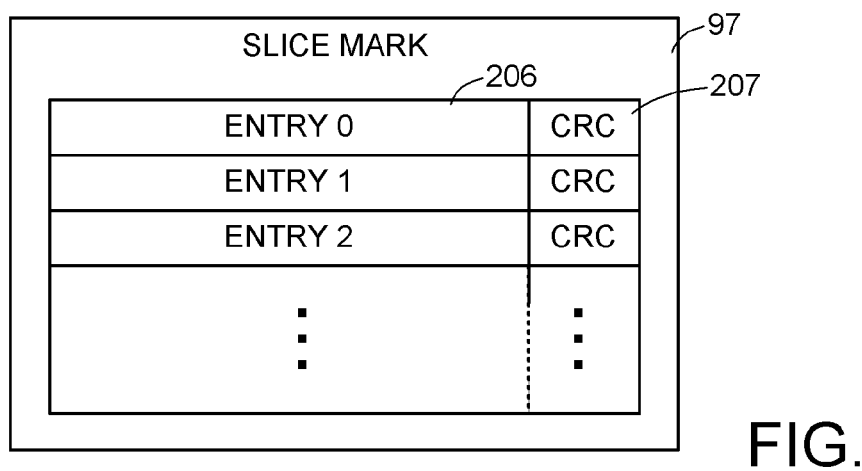
FIG. 15 is a block diagram showing cyclic redundancy checks (CRCs) in a slice mark.

As shown in FIG. 15, the slice mark 97 also includes a number of entries, and a respective CRC for each entry. Thus, the first entry 206 has a respective CRC 207. The size of each entry including its respective CRC in the slice mark 97 is the same as the size of each entry including its respective CRC in the slice map. In the absence of corruption or inconsistency when the slice map is being synchronized with a slice mark of a slice being added or removed from a metavolume, each entry in each slice mark will have a matching entry in the slice map.

Figure 16:
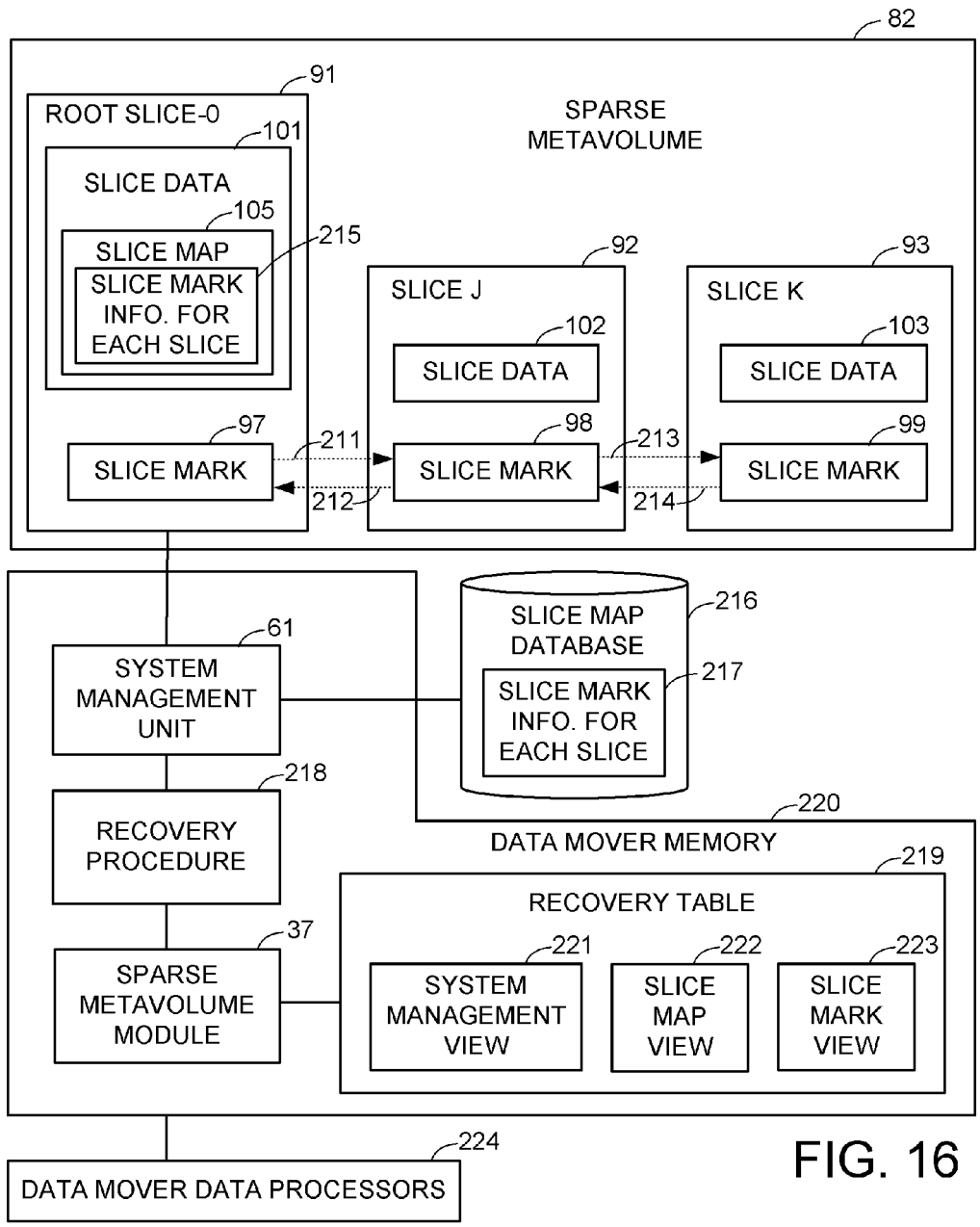
FIG. 16 is a block diagram showing data structures and program modules involved in recovery of the metadata of a sparse metavolume by reconciling any invalid metadata or differences between the metadata from three separate copies of the metadata.

FIG. 16 shows data structures and program modules involved in recovery of the metadata of a sparse metavolume by reconciling any invalid metadata or differences between the metadata from three separate copies of the metadata. The first copy of the metadata consists of the metadata in all of the slice marks 97, 98, 99 of all of the slices 91, 92, 93 provisioned to the sparse metavolume 82. The second copy of the metadata consists of the metadata in the slice map 105, because the slice map 105 includes the slice mark information 215 for each slice. The third copy of the metadata consists of slice mark information 217 for each slice kept in a slice map data base 216

In order to keep the slice marks from becoming lost after a disruption, each slice mark 97 keeps track of the previous and next provision slice using chaining on the slice marks. The slice mark on each slice confirms that the slice will be used for only one sparse volume. For example, as shown in FIG. 16, the slice mark 97 has a pointer to the slice mark 98, and the slice mark 98 has a pointer to the slice mark 99. Moreover, the slice mark 99 has a pointer back to the slice mark 98, and the slice mark 98 has a pointer to the slice mark 97. Thus, the slice marks themselves form a doubly-linked list, with the slice mark 97 in the root slice 91 at the head of the list.

In case of a complete disaster of the root slice-0 91, the root slice-0 can be rebuilt completely by finding any one slice, following the links in the slice marks to find the other slices in the chain, and then using the information in the slice marks in the chain to reconstruct the root slice. If there is any information missing from the slice marks in the chain, then this missing information can be obtained from the slice mark information 217 in the slice map database 216. In a similar fashion, in the case of slice mark corruption, the slice mark information 215 in the slice map 105 in the root slice-0 91 can be used to fix the slice mark. If there is any slice mark information missing from the slice map 105, then the slice mark information 217 can be obtained from the slice map database 216. In this fashion, the combination of the slice map 105 and the redundancy of the slice mark information facilitates the recovery of any root slice corruption, slice mark corruption, I/O errors and ownership conflicts.

For enhanced integrity, the slice map database 216 is a kernel mode database maintained in nonvolatile data storage by the system management unit 61, and other programs access the slice mark information 217 through the system management unit 61. The slice map database 216 keeps a copy of the slice mark information for each slice provisioned on each sparse metavolume on the network file server. The slice map database has entries of slice mark information, and each entry has a respective CRC, so that the slice mark information 217 in the slice mark database is organized in the same way as the slice mark information 215 in the slice map 105, as shown in FIG. 14. The slice map database 216, for example, is stored in the cached disk array (29 in FIG. 2) on disk drives separate from the disk drives that store the slices of the sparse metavolumes.

As shown in FIG. 16, absent a disaster scenario, a recovery procedure program 218 in the data mover memory 220 is executed by at least one of the data mover data processors 224 to allow a system administrator to fix automatically any sparse metavolume or any file system built on the sparse metavolume. The system management unit 61 reads the slice mark information 217 of the sparse metavolume from the slice map database 216 and provides this slice mark information to the recovery procedure 218. The recovery procedure 218 sends this slice mark information to the sparse metavolume module 37. The sparse metavolume module 37 prepares a recovery table 219 of three views; namely, a system management view 211, a slice map view 222, and a slice mark view 223. The system management view 211 is loaded with the slice mark information from the slice map database 216. The sparse metavolume module 37 loads the slice map view 222 with the slice mark information 215 from the slice map 105. The sparse metavolume module 37 loads the slice mark view 223 with the slice mark information from the slice marks 97, 98, 99. If the slice mark information for any of these views is missing, then the corresponding entries in the recovery table are flagged as invalid. In a similar fashion, an entry for any view is flagged as invalid if the CRC for the entry indicates that the entry has been corrupted. In particular, a new CRC for the entry is recomputed and compared to the old CRC in the entry, and if there is a miss-match, then the entry in the recovery table is flagged as invalid.

Once the recovery table 219 is loaded with the three views, an iterative procedure is applied to all entries of slice mark information for all slices for a given sparse metavolume. The iterative procedure reconciles each group of three corresponding entries of the three views, by considering whether or not the entries are flagged as invalid and by comparing the values of the entries that are not flagged as invalid, as further described below with reference to FIGS. 18, 19, and 20. Once the entries of the three views are reconciled, a file system check (fsck) utility program is run on the file system built on the metavolume.

If needed, the file system check (fsck) utility will correct the file system view or cooperate with the sparse metavolumes module to make the three views of the slice mark information consistent with the file system view of the underlying sparse metavolume. For example, in a conflicting case, all four views of a particular slice could be made consistent either by marking a slice with proper file system metadata, or by determining that the slice is not to be used in the file system and therefore returning the slice to a pool of free slices. The file system check (fsck) utility program is further described below with reference to FIGS. 24-25.

A system wide check of all sparse metavolumes and file systems can also be performed to resolve any ownership conflicts. Any cross-links found among the different file systems are removed. Thus, the entire slice map database is made consistent so that each provisioned slice is linked to only one sparse metavolme, and all file systems can be made stable.

Figure 17:
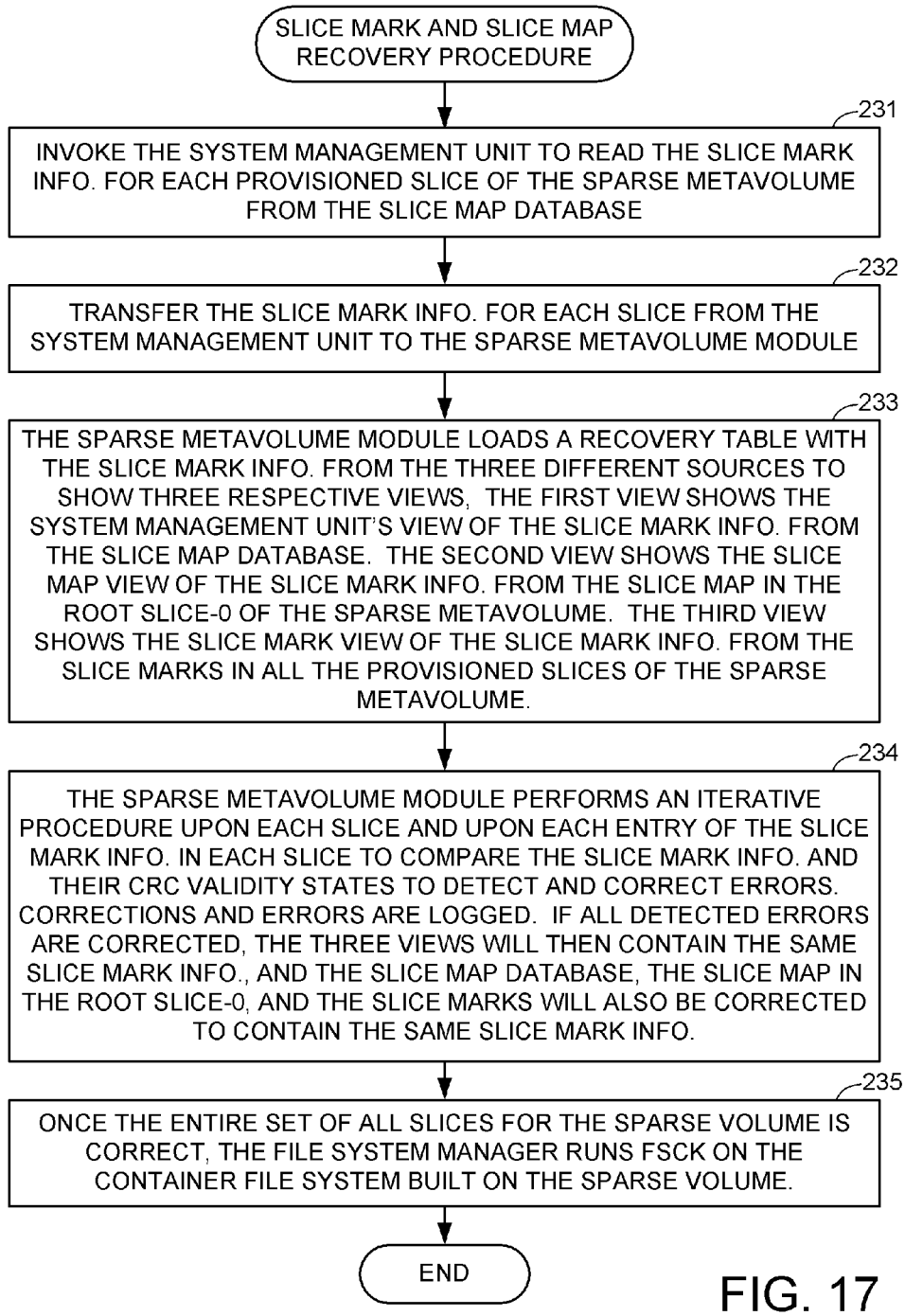
FIG. 17 is a flowchart of a slice mark and slice map recovery procedure using the data structures and program modules shown in FIG. 16.

FIG. 17 shows a specific example of the recovery procedure. In a first step 231, the system management unit is invoked to read the slice mark information for each provisioned slice of the sparse volume from the slice map database. In step 232, the slice mark information for each slice is transferred from the system management unit to the sparse metavolume module.

In step 233, the sparse metavolume module loads the recovery table with the slice mark information from the three different sources to show three respective views. The first view shows the system management unit's view of the slice mark information from the slice map database. The second view shows the slice map view of the slice mark information from the slice map in the root slice-0 of the sparse metavolume. The third view shows the slice mark view of the slice mark information from the slice marks in all the provisioned slices of the sparse metavolume.

In step 234, the sparse metavolume module performs an iterative procedure upon each slice and upon each entry of the slice mark information of each slice to compare the slice mark information and their CRC validity states to detect and correct errors. The corrections and errors are logged. If all detected errors are corrected, the three views will then contain the same slice mark information, and the slice map database, the slice map in the root slice-0, and the slice marks will also be corrected to contain the same slice mark information.

Finally, in step 235, once the entire set of all slices for the sparse volume is correct, the file system manager runs the file system utility (fsck) program on the container file system built on the sparse metavolume.

Figure 18:
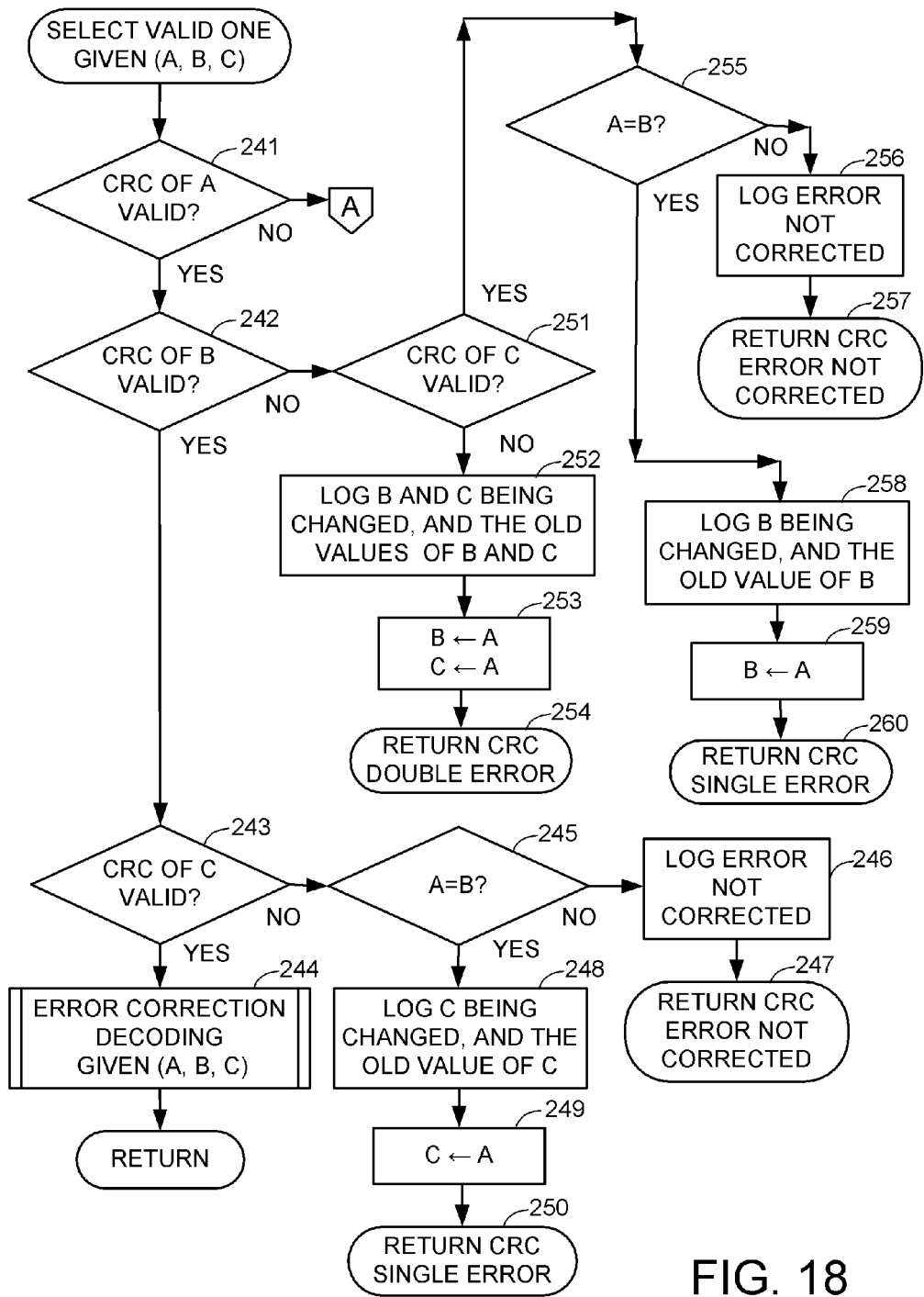
FIGS. 18 and 19 together comprise a flowchart of a routine for reconciling invalid data or differences between data in three copies of a data entry.
Figure 19:
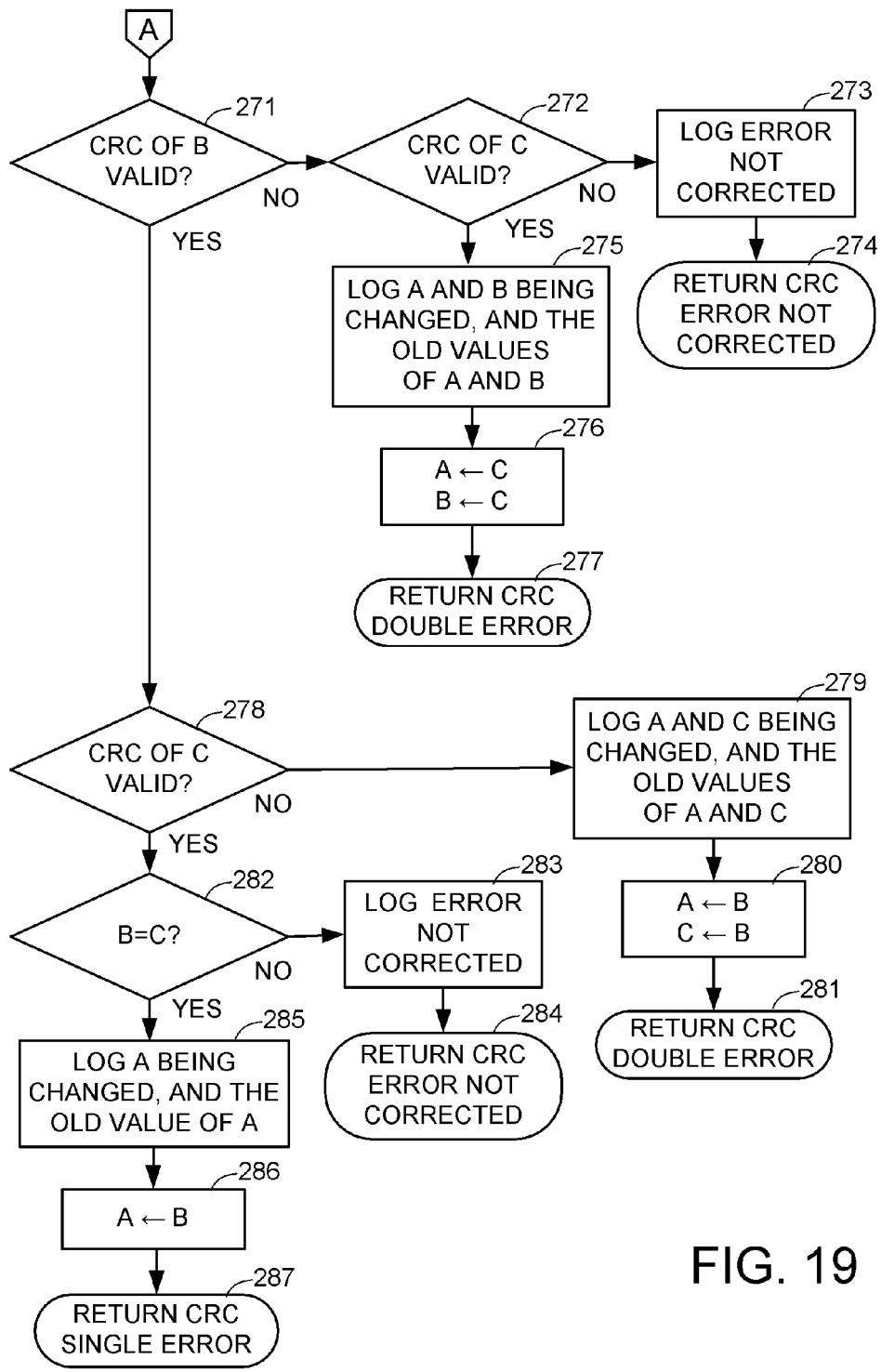

FIGS. 18 and 19 together comprise a flowchart of a routine for reconciling invalid data or differences between data in three copies of a data entry. In general, if all three views (A, B, C) for an entry of slice mark information have CRC errors, then there is a CRC error that cannot be corrected automatically. If only two views for an entry of slice mark information have CRC errors, then there is a double CRC error that is corrected by using the third view that does not have a CRC error. If only one view for an entry of slice mark information has a CRC error, then there is a single CRC error that can be corrected if the other two views are the same; otherwise, if the other two views are different, there is a CRC error that cannot be corrected automatically, unless one view is considered more reliable than the other.

If none of the three views have CRC errors, then there is no error if all three views are the same. Otherwise, if two of the views are the same, the other view is considered to have an error and so it is changed so all views are the same. If all three views are different, then there is an error that cannot be corrected automatically, unless one view is considered more reliable than the others.

In a first step 241 of FIG. 18, if the CRC of view "A" of the entry is valid, then execution continues to step 242. In step 242, if the CRC of view "B" of the entry is valid, then execution continues to step 243. In step 243, if the CRC of view "C" of the entry is valid, then execution continues to step 244 to call the subroutine of FIG. 20 in order to perform error correction decoding by using the "majority vote" technique. After step 244, execution returns.

In step 243, if the CRC of view "C" of the entry is not valid, then execution branches from step 243 to step 245. In step 245, if view "A" of the entry is not the same as view "B" of the entry, then execution branches to step 244. In step 244, the occurrence of an error not corrected is logged, and execution returns in step 247 with an error code indicating a CRC error not corrected.

In step 245, if view "A" of the entry is the same as view "B" of the entry, then execution continues to step 248. In step 248, the fact that view "C" of the entry is being changed, and the old value of the view "C" of the entry, is added to the log. In step 249, the view "C" of the entry is set equal to the view "A" of the entry. In step 250, execution returns with a return code indicating that there was a single CRC error that was corrected.

In step 242, if the CRC of view "B" of the entry is not valid, then execution branches to step 251. In step 251, if the CRC of view "C" of the entry is not valid, then execution continues to step 252 to log the fact that view "B" and view "C" of the entry are being changed, and the old values of view "B" and view "C" of the entry. In step 253, view "B" and view "C" of the entry are set equal to the view "A" of the entry. In step 254, execution returns with a return code indicating that a double CRC error was corrected.

In step 251, if the CRC of view "C" of the entry is valid, then execution branches to step 255. In step 255, if view "A" of the entry is not equal to view "B" of the entry, then execution branches to step 256 to log the occurrence of an error that was not corrected. In step 267, execution returns with an error code indicating a CRC error that was not corrected.

In step 255, if view "A" of the entry is equal to view "B" of the entry, then execution continues to step 258. In step 258, the fact that view "B" of the entry is being changed, and the old value of the view "B" of the entry, are logged. In step 259, the view "B" of the entry is set equal to the view "A" of the entry. In step 260, execution returns with a return code indicating that a single CRC error was corrected.

In step 241, if the CRC of view "A" of the entry is not valid, then execution branches to step 271 in FIG. 19. In step 271, if the CRC of view "B" of the entry is not valid, then execution branches to step 272. In step 272, if the CRC of view "C" of the entry is not valid, then execution branches to step 273. In this case, all three views of the entry are indicated to be corrupted. Therefore, in step 273, the occurrence of an error not corrected is logged. In step 274, execution returns with an error code indicating a CRC error not corrected.

In step 271, if the CRC of view "B" is valid, then execution continues to step 278. In step 278, if the CRC of view "C" is not valid, then execution branches to step 279. In step 279, the fact that view "A" and view "C" of the entry are being changed, and the old values of "A" and "C", are logged. In step 280, view "A" and view "C" of the entry are set equal to view "B" of the entry. In step 281, execution returns with a return code indicating that a double CRC error was corrected.

In step 278, if the CRC of view "C" is valid, then execution continues to step 282. In step 282, if view "B" of the entry is not the same as view "C" of the entry, then execution branches to step 283 to log the occurrence of an error not corrected. In step 284, execution returns with an error code indicating a CRC error that was not corrected.

In step 285, the fact that view "A" of the entry is being changed, and the old value of A, are logged. In step 286, view "A" of the entry is set equal to view "B" of the entry. In step 287, execution returns with a return code indicating that a single CRC error was corrected.

Figure 20:
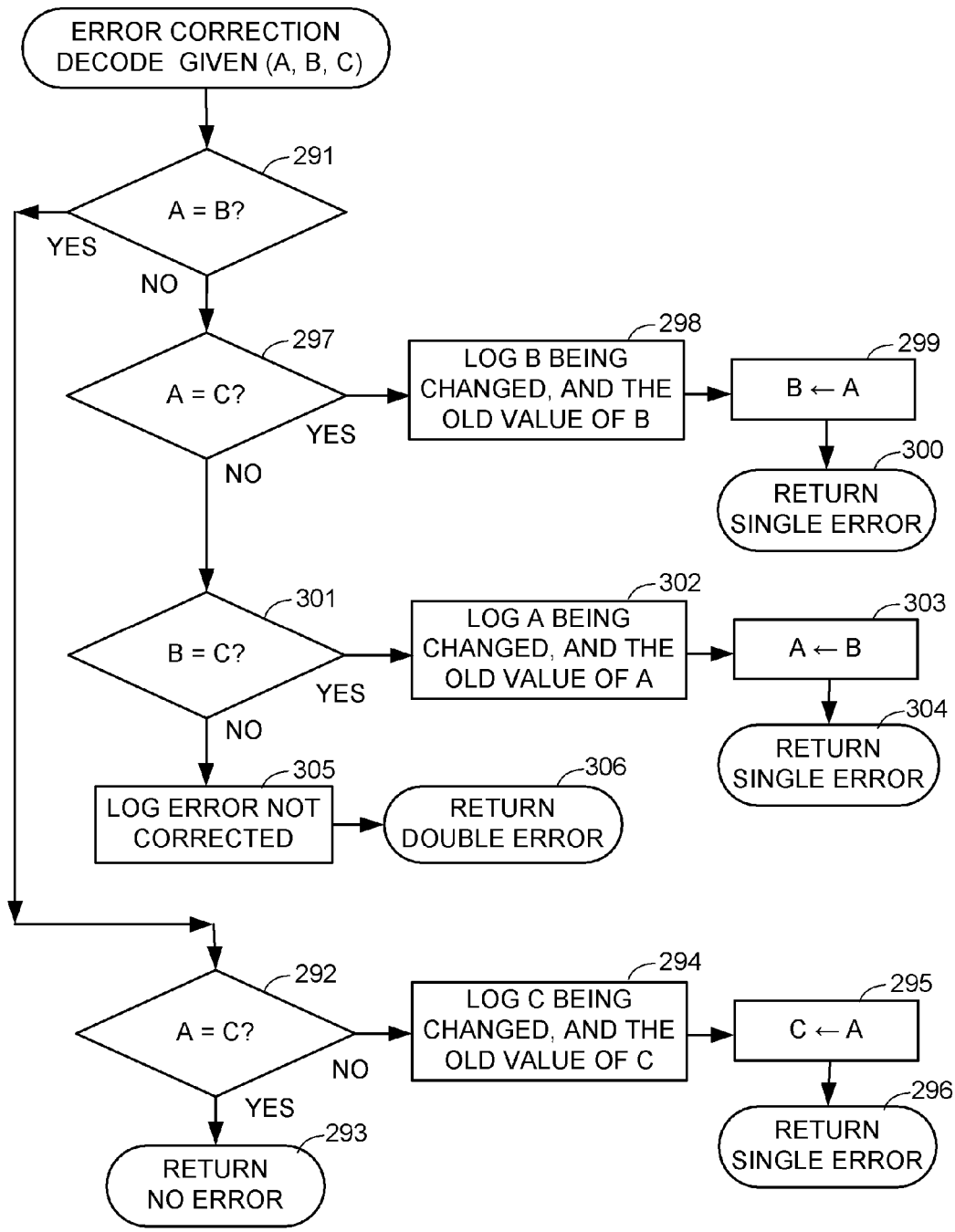
FIG. 20 is a flowchart of a subroutine called in FIG. 18 for error correction decoding of valid data in three copies of a data entry by employing a majority vote technique.

FIG. 20 is shows the subroutine called in FIG. 18 for error correction decoding of valid data in three views (A, B, and C) of an entry by employing the majority vote technique. In a first step 291, if view "A" of the entry is the same as view "B" of the entry, then execution branches to step 292. In step 292, if view "A" of the entry is the same as view "C" of the entry, then execution returns in step 293 with no error.

In step 292, if view "A" of the entry is not the same as view "C" of the entry, then execution branches to step 294 to log the fact that view "C" of the entry is being changed, and the old value of C. In step 295, view "C" of the entry is set equal to view "A" of the entry, and then execution returns in step 296 with a return code indicating correction of a single error.

In step 291, if view "A" of the entry is not the same as view "B" of the entry, then execution continues to step 297. In step 297, if view "A" of the entry is equal to view "C" of the entry, then execution branches to step 298 to log the fact that view "B" is being changed, and the old value of B. In step 299, view "B" of the entry is set equal to view "A" of the entry, and then execution returns in step 300 with a return code indicating correction of a single error.

In step 297, if view "A" of the entry is not the same as view "C" of the entry, then execution continues to step 301. In step 301, if view "B" of the entry is the same as view "C" of the entry, then execution branches to step 302 to log the fact that view "A" of the entry is being changed, and the old value of A. In step 303, view "A" of the entry is set equal to view "B" of the entry, and then execution returns in step 304 with a return code indicating correction of a single error.

In step 301, if view "B" of the entry is not the same as view "C" of the entry, then execution continues to step 305. In step 305, the occurrence of an error not corrected is logged. In step 306, execution returns with an error code indicating a double error not corrected.

4. Self Healing File System

The container file system, as described above, provides a mechanism for detecting and containing faults within the contained objects and permits recovery from corruptions without having to bring down the container file system or the file server. Early detection of corruption contains or limits the extent of the damage, and smart isolation of faults at the contained object level improves data availability by constraining the access to the corrupted part of the object. In place recovery ensures that the corruption is repaired on the fly without having to bring down the container file system and therefore improves data availability.

The container file system is equipped with file block checksums and regenerative metadata infrastructure for improving the depth of recovery and minimizing data loss. The container file system also provides fault isolation for elimination of induced file server panics in order to improve service and data availability. Moreover, the container file system proactively detects and contains faults, errors, and corruptions, and does in place, online, and non-intrusive recovery.

The container file system provides early detection of various kinds of faults and errors, including but not limited to metadata inconsistency, silent on disk corruptions, in core memory corruptions, and file system level runtime dead locks. In particular, the container file system detects corruptions of the sparse map of the file system, cylinder group overhead (headers, bitmaps, etc), individual inodes, indirect blocks, and other extended metadata structures like access control lists (ACL) and quotas. The detection of such object level corruption is enabled by an object cyclic redundancy code (CRC) checksum and a compound block level CRC for tracking block level corruptions. The CRC for these objects and the contained blocks (along with other objects) are checked at various times throughout the life cycle, such as when reading the object from disk, and when updating the object in memory.

Automatic recovery from corruption of a contained object includes regeneration of metadata of the object. The container file system can recover the slice map (from the volume database and the cylinder group map), cylinder groups (from the block metadata, used inodes) partial inodes (from block metadata) and indirect blocks (from block metadata). To support error detection and metadata regeneration, the container file system maintains the per-block metadata (153 in FIG. 8). The cylinder group maintains the per-block metadata for the blocks that it owns. The file system populates the per-block block metadata as and when a block is allocated—either for an indirect block or any other metadata block. As and when the metadata objects contained within the block are updated, the CRC for that block is atomically updated and committed to disk. The CRC stored in the per-block metadata is computed and checked at various 'check-points' in the life cycle of the objects contained within the block. In addition to validating the object integrity in-place (at the time when it is referred to), the file system also runs background scrubber processes that proactively run integrity checks on the cached and on-disk file system objects using the per-block metadata.

Figure 21:
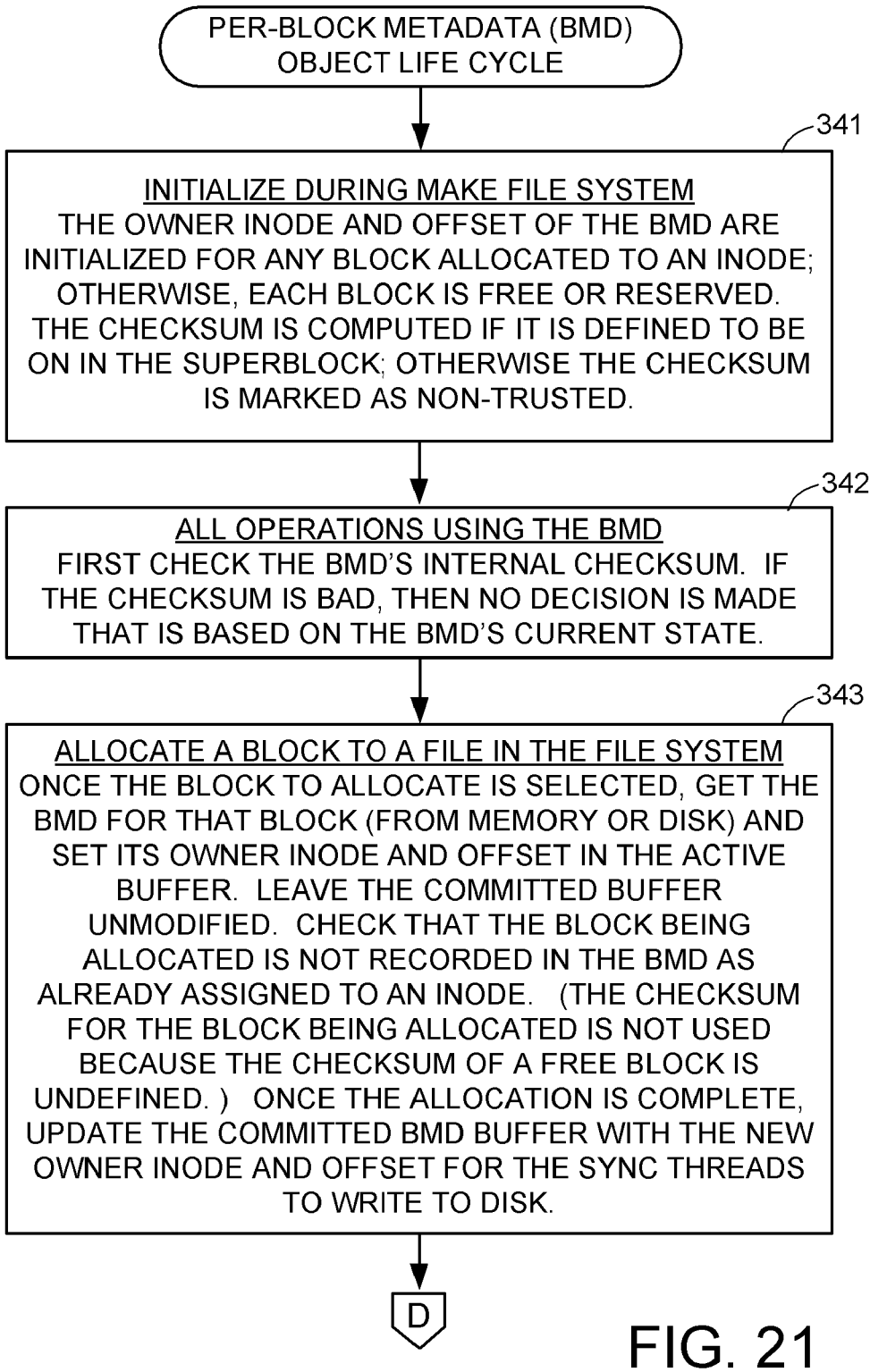
FIGS. 21, 22 and 23 together comprise a flowchart of the lifecycle of per-block metadata in a container file system.
Figure 22:
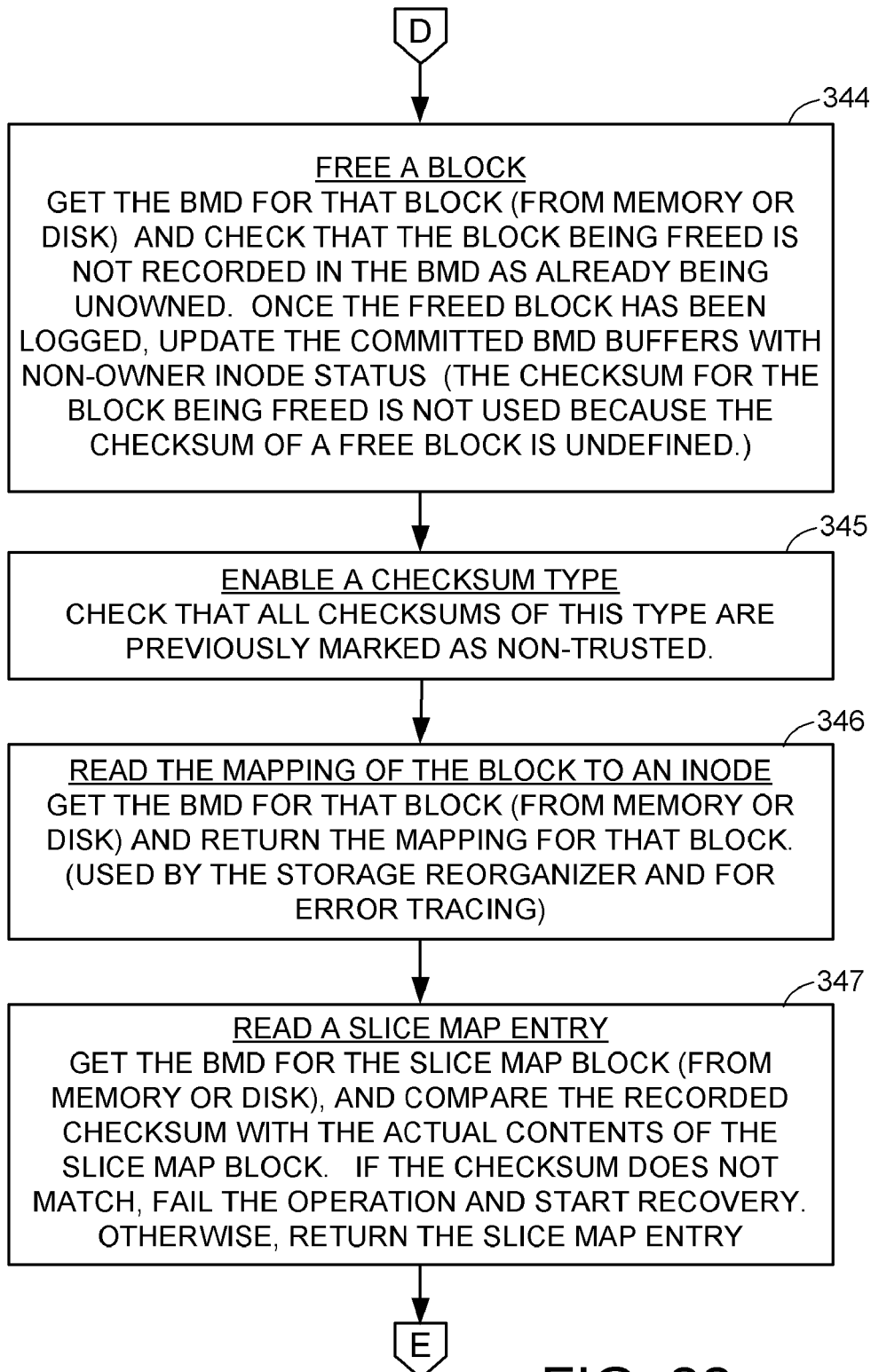
Figure 23:
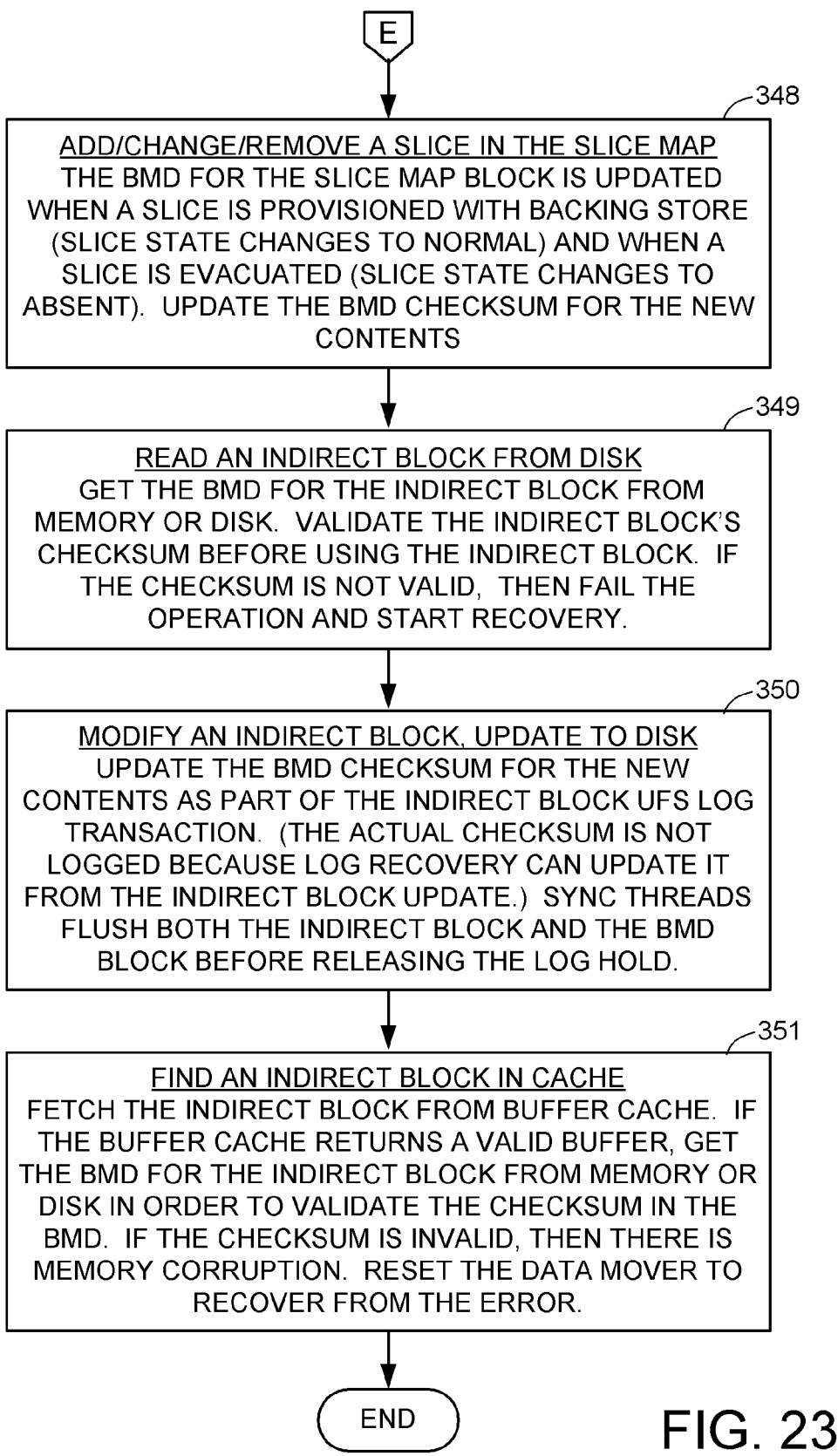

FIGS. 21, 22, and 23 show the life cycle of a per-block metadata (BMD) object (153 in FIG. 8). In a first step 341 of FIG. 21, the BMD object is initialized during the task of making the container file system. The owner inode and offset of the file system block are initialized in the BMD for any file system block allocated to an inode. Otherwise, each file system block is either free or reserved. The CRC checksum is computed if it is defined to be on in the superblock; otherwise, the checksum is marked as "non-trusted." In step 342, for all operations using the BMD, the BMD's own internal checksum is checked against the contents of the BMD. If the checksum indicates an error in the BMD, then no decision is made that is based on the BMD's current state.

In step 343, the BMD for a file system block is updated when the block is allocated to a container file in the container file system. Once the block to allocate is selected, the BMD for that block is obtained (from memory or disk) and its owner inode and offset is set in the active one of the block metadata buffers (148 in FIG. 11). The committed one of the block metadata buffers is left unmodified. The BMD is checked to ensure that the block being allocated is not recorded in the BMD as already assigned to an inode. (The checksum for the block being allocated is not used at this time because the checksum of a free block is undefined.) Once the block allocation is complete, the committed one of the block metadata buffers is updated with the new owner inode and offset in order for the sync threads to write the contents of the committed buffer to disk.

In step 344 in FIG. 22, the BMD for a file system block is updated when the block is freed. The BMD for the block is obtained from memory or else disk, and checked to ensure that the block being freed is not recorded in the BMD as already being unowned. Once the freed block has been logged, the active and committed BMD buffers are updated to indicate that the block is not owned by an inode. (The checksum for the block being freed is not used because the checksum of a free block is undefined.)

In step 345, when a checksum type for the BMDs is enabled, a check is made to ensure that all checksums of this type are previously marked as non-trusted. If all checksums of this type are not previously marked as not-trusted, then an error is returned to the client requesting the enabling of the checksum type. This is done to prevent inadvertent on-off cycling of the protection provided by the checksums.

In step 346, the BMD for a file system block is accessed to read the mapping of the block to an inode. The BMD for the block is obtained from memory or disk, and that mapping for the block is returned to the requesting client or application. For example, the mapping is used by the storage reorganizer to find the inodes having blocks being relocated from a slice marked for released, and for error tracing to identify inodes having blocks found to be corrupted.

In step 347, the BMD for a file system block containing a slice map entry is read when a slice map entry is read. The BMD from memory or else disk is read to obtain the checksum for the file system block containing the slice map entry and compared against a checksum re-computed from the actual contents of the slice map block. If the checksum from the BMD does not match the checksum re-computed from the actual contents of the slice map block, then the operation needing the slice map entry is failed, and recovery is started in an attempt to restore the slice map from slice-0 and the slice marks of any other slices provisioned in the sparse metavolume of the container file system.

In step 348 of FIG. 23, the BMD for a file system block containing a slice map entry is also read when a slice map entry is updated when a slice is provisioned with backing store (the slice state changes to normal) and when a slice is evacuated (the slice state changes to absent). The checksum in the BMD for the file system block is updated with a new checksum for the new contents of the slice map block.

In step 349, the BMD for a file system block that is an indirect block is read when the indirect block is read from disk. The BMD is read from memory or else disk to obtain the checksum for the indirect block and to compare it against a checksum re-computed from the actual contents of the indirect block. If the checksum from the BMD does not match the checksum re-computed from the actual contents of the indirect block, then the operation needing the indirect block is failed, and recovery is started in an attempt to restore the container file system metadata using a "fsck" utility as further described below.

In step 350, the BMD for a file system block that is an indirect block is updated when an indirect block is modified and updated to disk. The checksum for the indirect block is updated in the BMD for the new contents of the indirect block as part of the indirect block UFS log transaction. (The actual checksum is not logged because log recovery can update the checksum from the indirect block update.) Sync threads flush both the indirect block and the BMD block before releasing the log hold.

In step 351, the BMD for a file system block that is an indirect block is read when the indirect block is fetched from buffer cache. If the buffer cache returns a valid buffer, then the BMD is read from memory or else disk to obtain the checksum for the indirect block and to compare it against a checksum re-computed from the actual contents of the indirect block. If the checksum from the BMD does not match the checksum re-computed from the actual contents of the indirect block, then there is memory corruption. The operation needing the indirect block is failed, and the data mover is reset to recover from the error.

Figure 24:
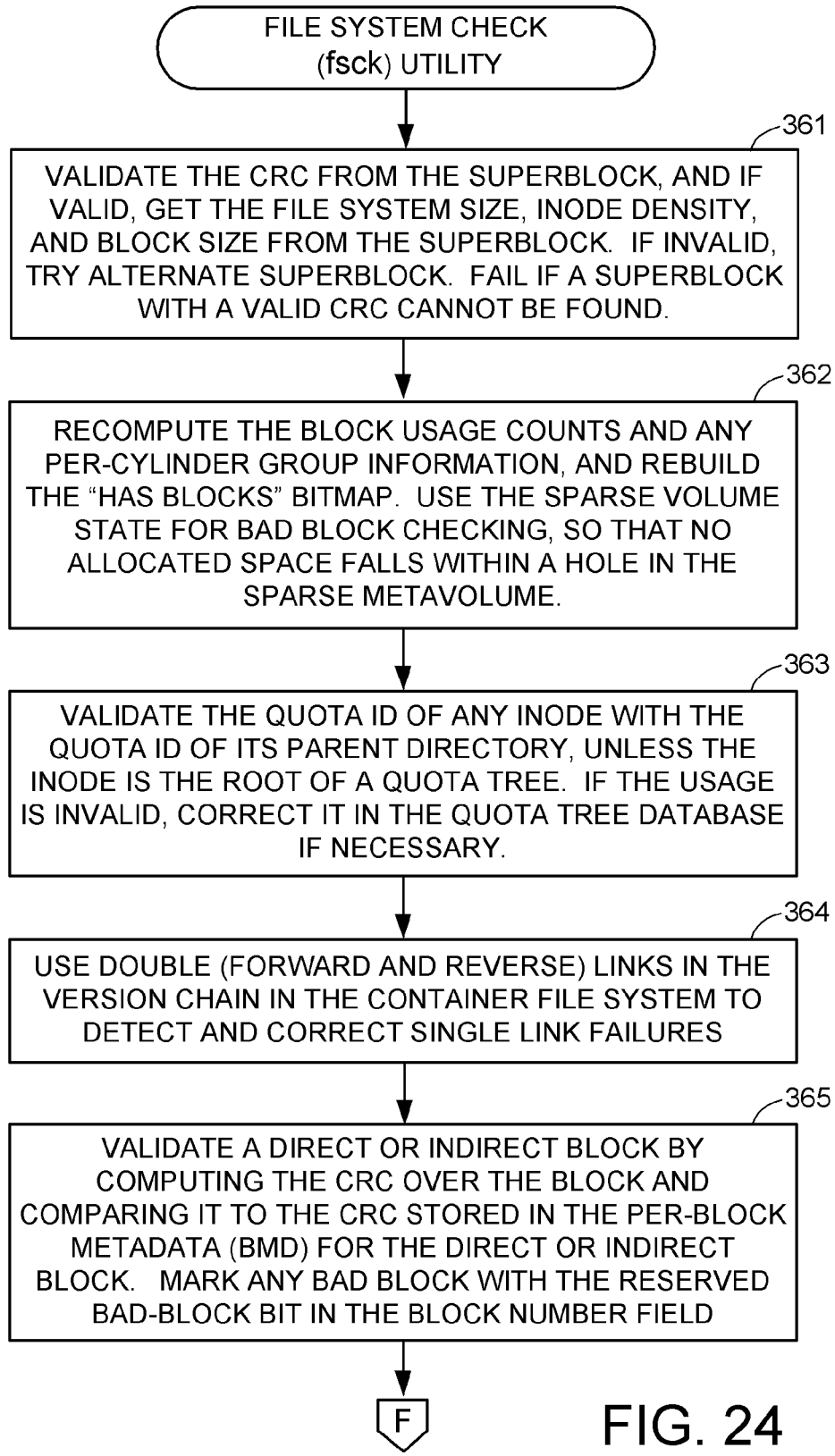
FIGS. 24 and 25 together comprise a flowchart of steps in a file system check utility using various error detection and recovery features of a container file system.
Figure 25:
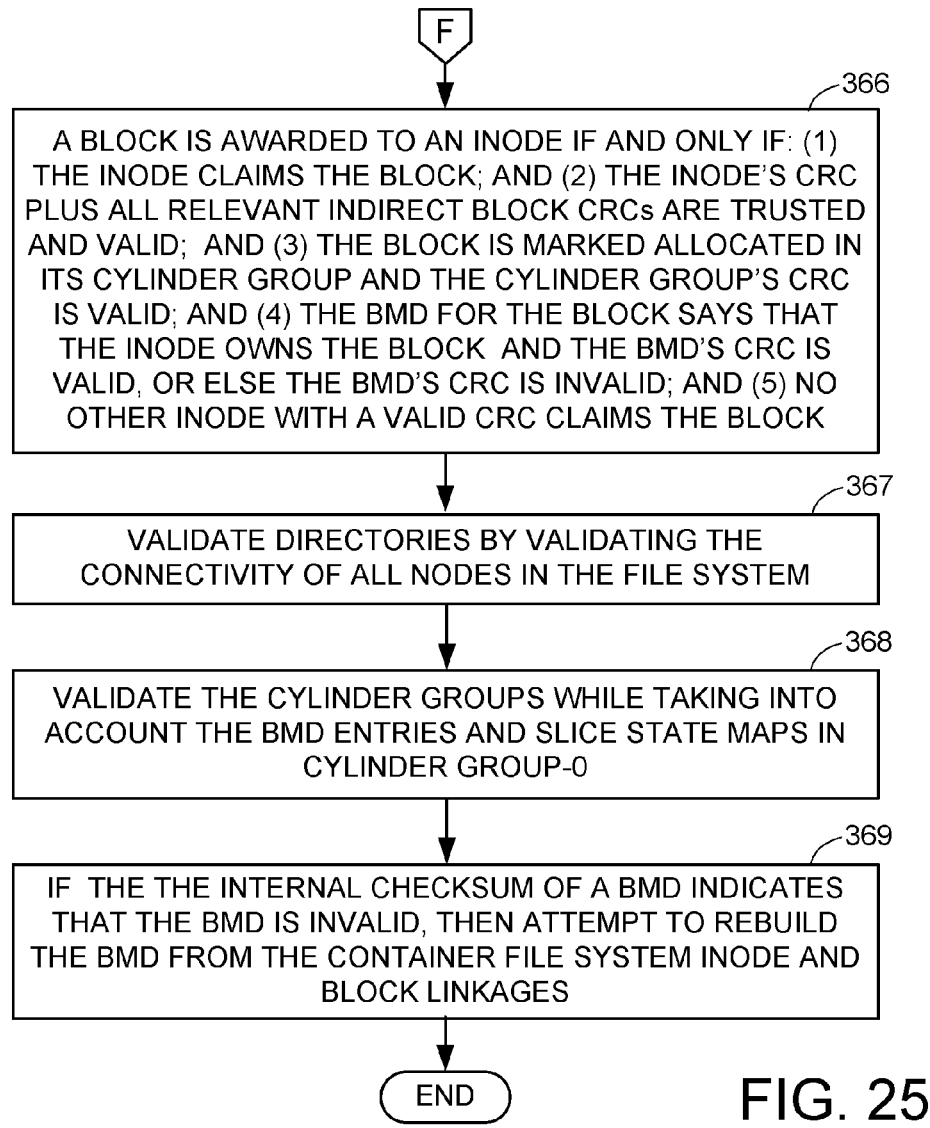

FIGS. 24 and 25 show how a file system checking (fsck) utility is modified to exploit the error detection and correction capabilities of the container file system. In a first step 361, a CRC from the superblock of the container file system is read and compared to a CRC re-computed from the contents of the superblock. If there is a match, then the CRC read from the superblock is valid. If valid, the file system size, inode density, and block size are read from the superblock. If invalid, then these operations are repeated on the alternate superblock. The fsck utility fails if a superblock with a valid CRC cannot be found.

In step 362, the block usage counts and any per-cylinder group information is recomputed. The "has blocks" bitmap is rebuilt. The sparse volume state is used for bad block checking, so that no allocated space falls within a hole in the sparse metavolume.

In step 363, the quota ID of any inode is validated with the quota ID of its parent directory, unless the inode is the root of a directory tree. If the usage is invalid, then it is corrected in the quota tree database if necessary.

In step 364, double links (forward and reverse) are used in the version chain in the container file system to detect and correct single link failures. This is further described below with reference to FIG. 26.

In step 365, a direct or indirect block is validated by computing the CRC over the block and comparing it to the CRC stored in the per-block metadata (BMD) for the direct or indirect block. If there is not a match, the block is marked as a bad block by setting the reserved bad-block bit in the block number field (160 in FIG. 7) of the pointers to the block in any inodes or indirect blocks that reference the block.

In step 366 of FIG. 25, a block is awarded to an inode if an only if: (1) the inode claims the block; and (2) the inode's CRC plus all relevant indirect block CRCs are trusted and valid; and (3) the block is marked allocated in its cylinder group and the cylinder group's CRC is valid; and (4) the BMD for the block says that the inode owns the block and the CRC is valid, or else the BMD's CRC is invalid; and (5) no other inode with a valid CRC claims the block.

In step 367, the directories are validated by validating the connectivity of all nodes in the file system.

In step 368, the cylinder groups are validated while taking into account that the format of cylinder group-0 is different from the other cylinder groups, for example because cylinder group-0 includes the slice state map (as shown in FIG. 12).

Finally, in step 369, if the internal checksum of a BMD indicates that the BMD is invalid, then an attempt is made to rebuild the BMD from the container file system inode and block linkages.

Figure 26:
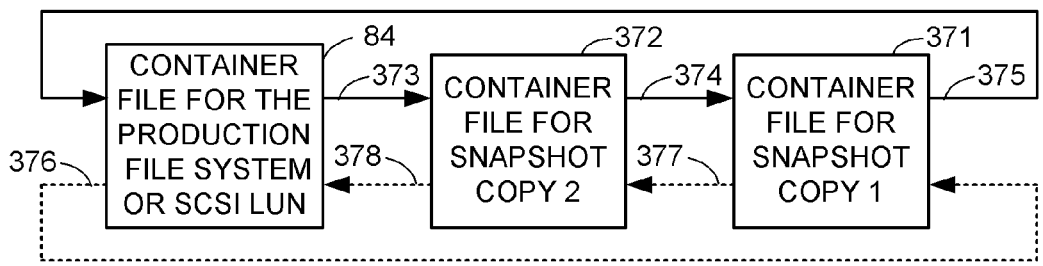
FIG. 26 shows a doubly-linked version chain of container files in a container file system.

FIG. 26 shows a version chain of container files in the container file system. The version chain includes the container file 84 for the production file system or iSCSI LUN, a container file 371 for a first snapshot copy of production file system or iSCSI LUN, and a container file 372 for a second snapshot copy of the production file system or iSCSI LUN. The version chain is a doubly-linked list by virtue of forward links 373, 374, and 375, and reverse links (shown in dotted lines) 377, 378, and 379. Each link is implemented as a pointer in an inode of the respective container file from which the link originates. The value of the pointer is the inode number of the respective container file to which the link is directed. Link corruption is detected when a link does not point from a source container file to a destination container file having a pointer in the reverse direction back to the source container file. If any one of the forward links is corrupted, then it is regenerated by tracing the chain of reverse links, and conversely, if any one of the reverse links is corrupted, then it is regenerated by tracing the chain of forward links. For example, if the forward link 273 is corrupted, then upon tracing the chain of reverse links, upon finding the link 378 matching the inode number of the container file 84 containing the corrupted link, it is discovered that the corrupted link should he restored with the inode number of the inode containing the link 378.

By tracing the forward and reverse links in the version chain, it may be possible to construct a valid version chain if some of the snapshot copies are found to be entirely corrupted. For example, if the container file 372 is so corrupted that its forward link pointer 374 and its reverse link pointer 378 are invalid and the container file 372 will be deleted, then a consistent version chain (without the corrupted container file 372) can be constructed by tracing the version chain so far as possible forward and reverse starting from the container file for the production file system or iSCSI LUN, and then linking together the two dangling ends of this chain. Specifically, for the case of the container file 372 being entirely corrupted, a valid version chain is constructed by setting the forward pointer 373 to the inode number of the container file 371 for the first snapshot copy, and by setting the reverse pointer 377 to the inode number of the container file 84 for the production file system or iSCSI LUN.

Figure 27:
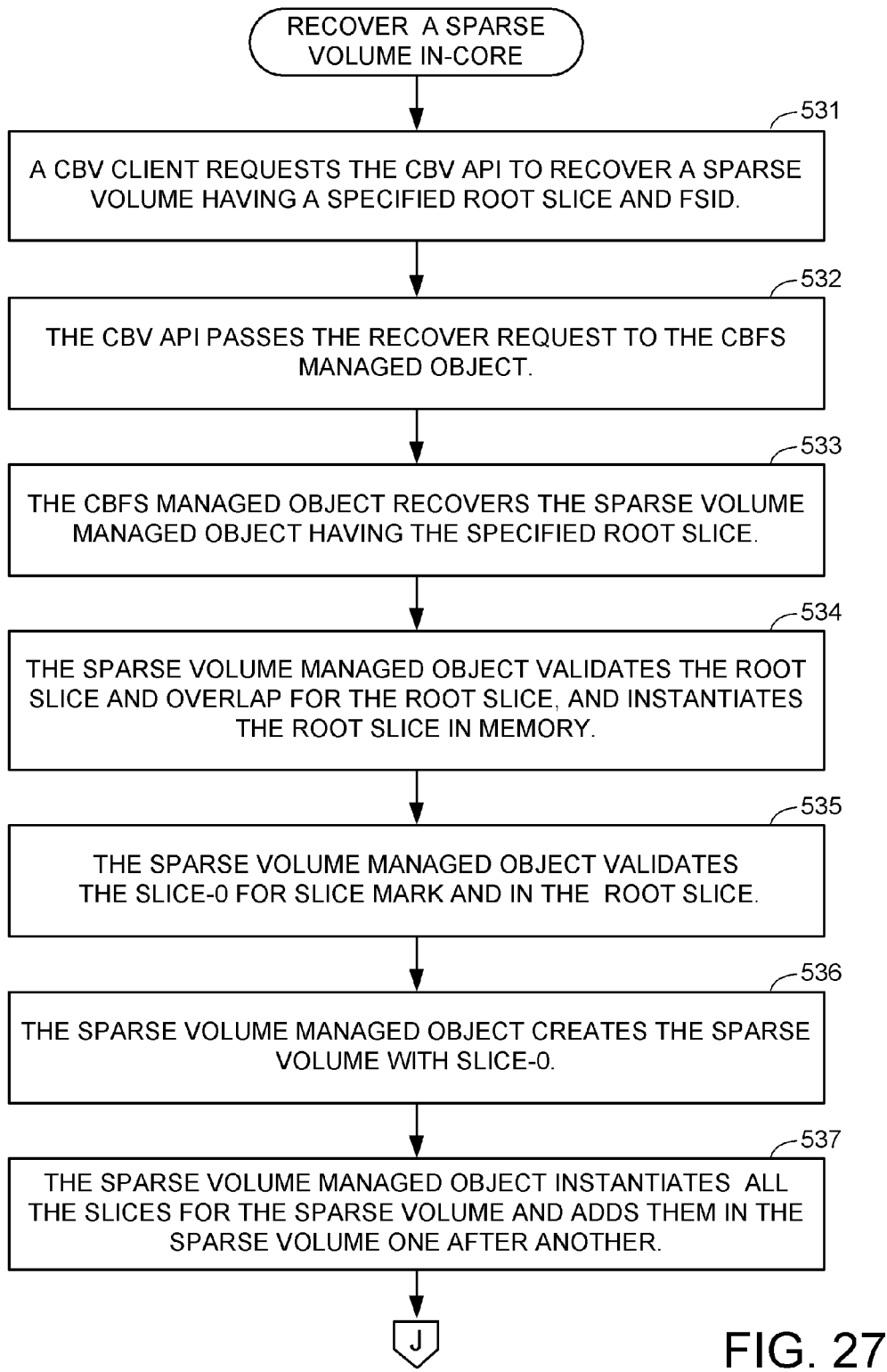
FIGS. 27 and 28 together comprise a flowchart of a procedure for recovering a sparse volume in-core.

FIG. 27 shows a procedure for recovering a sparse volume in-core object. In a first step 531, a CBV client requests the CBV API to recover a sparse volume having a specified root slice and FSID. In step 532, the CBV API passes the recover request to the CBFS managed object. In step 533, the CBFS managed object recovers the sparse volume managed object having the specified root slice. In step 534, the sparse volume managed object validates the root slice and overlap for the root slice, and instantiates the root slice in memory. In step 535, the sparse volume managed object validates the slice-0 for slice mark and in the root slice. In step 536, the sparse volume managed object creates the sparse volume with slice-0. In step 537, the sparse volume managed object instantiates all the slices for the sparse volume and adds them in the sparse volume one after another. Execution continues from step 537 to step 538 in FIG. 50.

Figure 28:
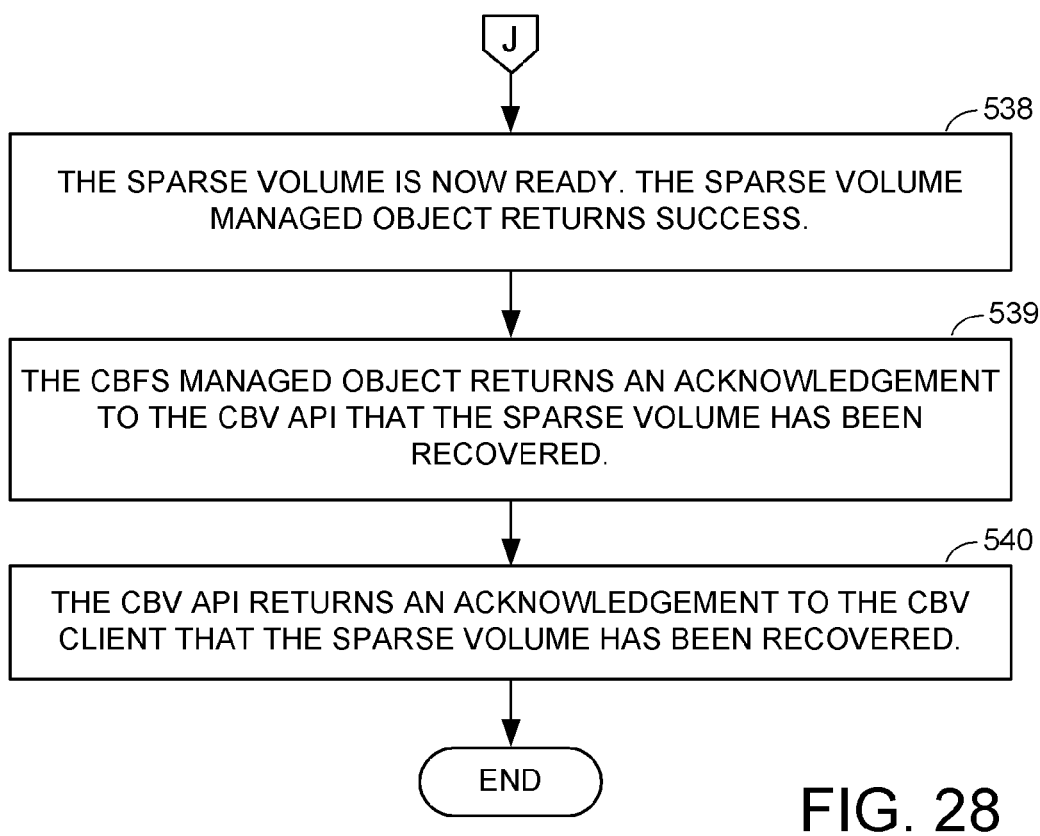

In step 538 of FIG. 28, the sparse volume is now ready. The sparse volume managed object returns success. In step 539, the CBFS managed object returns an acknowledgement to the CBV API that the sparse volume has been recovered. In step 540, the CBV API returns an acknowledgement to the CBV client that the sparse volume has been recovered. The procedure is finished.

In view of the above, there has been described a file server architecture for enhanced decoupling of logical storage from physical storage and for proactive detection and containment of faults, errors, and corruptions in a file system, in order to enable in place (online) and non-intrusive recovery. The file system is built upon a thinly provisioned logical volume, and there are stored three copies of the metadata defining the logical volume in order to provide quick, deterministic, and reliable recovery from a faulted system. A first copy of the metadata is distributed among all of the slices of physical storage allocated to the logical volume. A second copy of the metadata is stored in a root slice of the logical volume. A third copy of the metadata is stored separate from the slices of physical storage allocated to the logical volume.

What is claimed is:

1. A file server comprising:
   physical data storage; and
   at least one data processor coupled to the physical data storage for accessing the physical data storage;
   wherein said at least one data processor is programmed for maintaining a sparse metavolume of the physical data storage, the sparse metavolume includes slices of the physical data storage allocated to the sparse metavolume, the sparse metavolume provides logical data storage, some of the logical data storage is mapped to the slices of the physical data storage allocated to the sparse metavolume, some of the logical data storage does not have allocated physical storage and is not mapped to the slices of the physical data storage allocated to the sparse metavolume, and the sparse metavolume has slice metadata defining the allocation of the slices of the physical data storage to the sparse metavolume and the mapping of the logical data storage to the slices of the physical data storage that are allocated to the sparse metavolume, and
   wherein the file server stores three copies of the slice metadata, and said at least one data processor is programmed with a recovery program executable by said at least one data processor to recover from a disruption by comparing the three copies of the slice metadata to detect and correct errors in the slice metadata.

2. The file server as claimed in claim 1, wherein one of the three copies of the slice metadata is stored in a kernel mode database.

3. The file server as claimed in claim 1, wherein a first one of the three copies of the slice metadata is distributed among the slices allocated to the sparse metavolume, a second one of the three copies of the slice metadata is stored in one of the slices allocated to the sparse metavolume, and a third one of the three copies of the slice metadata is stored separate from the slices allocated to the sparse metavolume.

4. The file server as claimed in claim 3, wherein the third one of the three copies of the slice metadata is stored in a kernel mode database.

5. The file server as claimed in claim 1, wherein each slice of physical data storage allocated to the sparse metavolume includes a slice mark containing a respective portion of the slice metadata defining allocation of said each slice to the sparse metavolume and mapping of the logical data storage of the sparse metavolume to said each slice, one of the three copies of the slice metadata is comprised of the respective portions of the slice metadata in slice marks of the slices of physical data storage allocated to the metavolume, the slice marks are chained together by links, and the recovery procedure is executable by said at least one data processor to recover from the disruption by following the links to collect the slice metadata contained in the slice marks.

6. The file server as claimed in claim 1, wherein each of the three copies of the slice metadata is organized as a series of entries, and each entry has a value and an indication of validity of the value, and the recovery program is executable by said at least one data processor to recover from a disruption by applying an iterative procedure to each entry to detect and correct any error in each entry in response to the values and indications of validity of said each entry in each of the three copies of the slice metadata.

7. The file server as claimed in claim 6, wherein the indications of validity are cyclic redundancy checks indicating whether the values have been corrupted.

8. The file server as claimed in claim 6, wherein the recovery procedure is executable by said at least one data processor to recover from a disruption by invoking a procedure to load the entries of each of the three copies of the slice metadata into a recovery table, and then to apply the iterative procedure to the entries of each of the three copies of the slice metadata in the recovery table.

9. The file server as claimed in claim 6, wherein the iterative procedure is executable by said at least one data processor to produce a log of errors detected and corrected in the three copies of the slice metadata.

10. A file server comprising:
    physical data storage; and
    at least one data processor coupled to the physical data storage for accessing the physical data storage;
    wherein said at least one data processor is programmed for maintaining a sparse metavolume of the physical data storage, the sparse metavolume includes slices of the physical data storage allocated to the sparse metavolume, the sparse metavolume provides logical data storage, some of the logical data storage is mapped to the slices of the physical data storage allocated to the sparse metavolume, some of the logical data storage does not have allocated physical storage and is not mapped to the slices of the physical data storage allocated to the sparse metavolume, and the sparse metavolume has slice metadata defining the allocation of the slices of the physical data storage to the sparse metavolume and the mapping of the logical data storage to the slices of the physical data storage that are allocated to the sparse metavolume, and
    wherein the file server stores three copies of the slice metadata, and said at least one data processor is programmed with a recovery procedure executable by the said at least one data processor to recover from a disruption by comparing the three copies of the slice metadata to detect and correct errors in the slice metadata,
    wherein each slice of physical data storage allocated to the sparse metavolume includes a slice mark containing a respective portion of the slice metadata defining allocation of said each slice to the sparse metavolume and mapping of the logical data storage of the sparse metavolume to said each slice, a first one of the three copies of the slice metadata is comprised of the respective portions of the slice metadata in the slice marks of the slices of physical data storage allocated to the metavolume, the slice marks are chained together by links, and the recovery procedure is executable by said at least one data processor to recover from the disruption by following the links to collect the slice metadata contained in the slice marks, wherein a second one of the three copies of the slice metadata is maintained in one of the slices allocated to the sparse metavolume, and wherein a third one of the three copies of the slice metadata is stored in a kernel mode database separate from the slices of the physical data storage allocated to the sparse metavolume.

11. The file server as claimed in claim 10, wherein each of the three copies of the slice metadata is organized as a series of entries, and each entry has a value and a cyclic redundancy check indicating whether the value has been corrupted, and the recovery procedure is executable by said at least one data processor to recover from a disruption by applying an iterative procedure to each entry to detect and correct any error in each entry in response to the three respective values and the three respective cyclic redundancy checks in said each entry in the three copies of the slice metadata.

12. A computer-implemented method of operating a file server, the file server having physical data storage, and a sparse metavolume of the physical data storage, the sparse metavolume including slices of the physical data storage allocated to the sparse metavolume, the sparse metavolume providing logical data storage, some of the logical data storage being mapped to the slices of the physical data storage allocated to the sparse metavolume, and some of the logical data storage not having allocated physical storage and not being mapped to the slices of the physical data storage allocated to the sparse metavolume, and the sparse metavolume having slice metadata defining the allocation of the slices of the physical data storage to the sparse metavolume and the mapping of the logical data storage of the sparse metavolume to the slices of the physical data storage that are allocated to the sparse metavolume, said method comprising:

maintaining three copies of the slice metadata in the physical data storage, and recovering from a disruption in operation of the file server by executing a recovery program in memory of the file server, the recovery program comparing the three copies of the slice metadata to detect and correct errors in the slice metadata.

13. The computer-implemented method as claimed in claim 12, which includes maintaining one of the three copies of the slice metadata as a kernel mode database in the physical data storage.

14. The computer-implemented method as claimed in claim 12, which includes maintaining a first one of the three copies of the slice metadata distributed among the slices allocated to the sparse metavolume, maintaining a second one of the three copies of the slice metadata in one of the slices allocated to the sparse metavolume, and maintaining and storing a third one of the three copies of the slice metadata separate from the slices allocated to the sparse metavolume.

15. The computer-implemented method as claimed in claim 14, which includes maintaining the third one of the three copies of the slice metadata in a kernel mode database in the physical data storage.

16. The computer-implemented method as claimed in claim 12, wherein each slice of physical data storage allocated to the sparse metavolume includes a slice mark containing a respective portion of the slice metadata defining allocation of said each slice to the sparse metavolume and mapping of the logical data storage of the sparse metavolume to said each slice, one of the three copies of the slice metadata is comprised of the respective portions of the slice metadata in the slice marks of the slices of physical data storage allocated to the metadata, and the slice marks are chained together by links, and the recovery procedure is executable by said at least one data processor to recover from the disruption by following the links to collect the slice metadata contained in the slice marks.

17. The computer-implemented method as claimed in claim 12, wherein each of the three copies of the slice metadata is organized as a series of entries, and each entry has a value and indication of validity of the value, and the method further includes applying an iterative procedure to each entry to detect and correct any error in each entry in response to the values and indications of validity of said each entry in each of the three copies of the slice metadata.

18. The computer-implemented method as claimed in claim 17, which includes computing cyclic redundancy checks to provide the indications of validity of the values.

19. The computer-implemented method as claimed in claim 17, which further includes invoking a procedure to load the entries of each of the three copies of the slice metadata into a recovery table, and then to apply the iterative procedure to the entries of each of the three copies of the slice metadata in the recovery table.

20. The computer-implemented method as claimed in claim 17, which further includes the iterative procedure producing a log of errors detected and corrected in the three copies of the slice metadata.

* * * * *